May 26, 1964
M. CAMRAS
3,134,550
TAPE CARTRIDGE SELECTOR TRANSDUCING MACHINE
Filed March 22, 1961
7 Sheets-Sheet 1
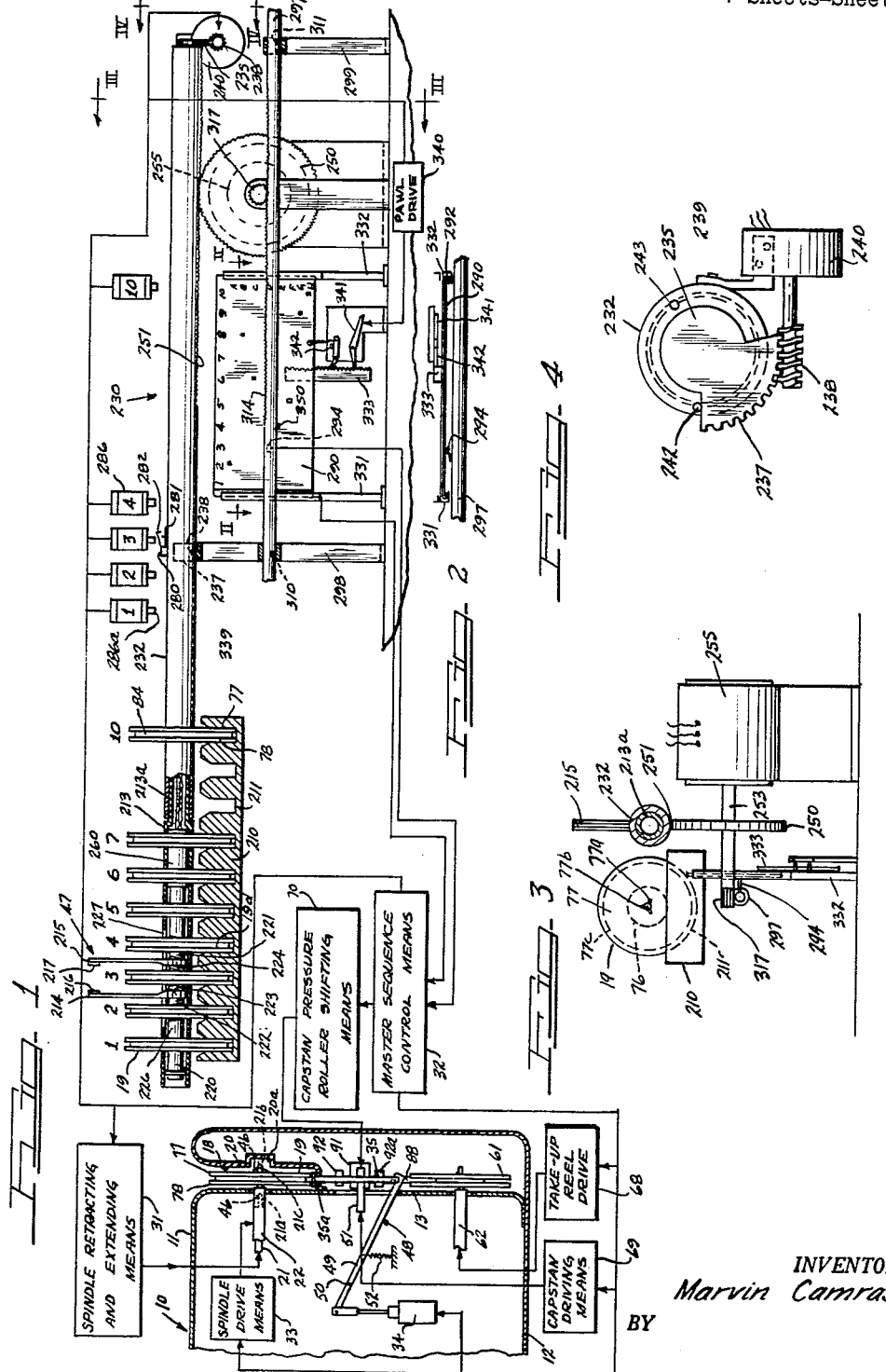
INVENTOR.
Marvin Camras
BY
Hill, Sherman, Meroni, Gross & Simpson
ATTORNEYS

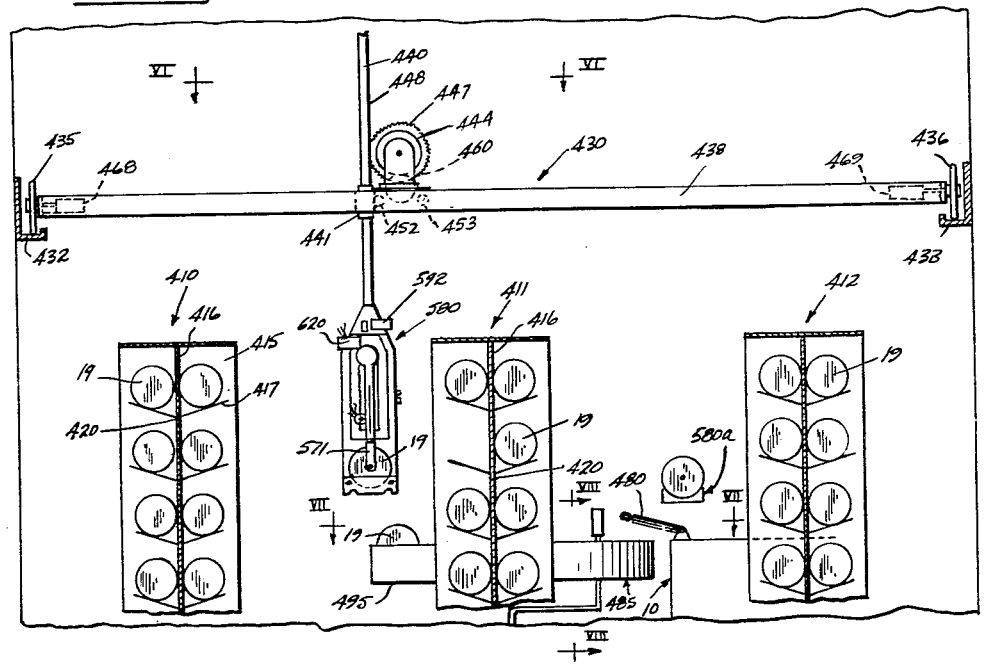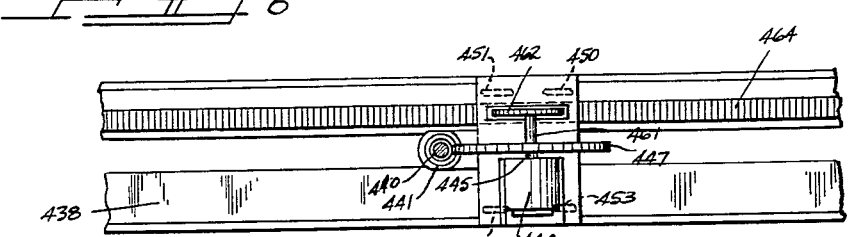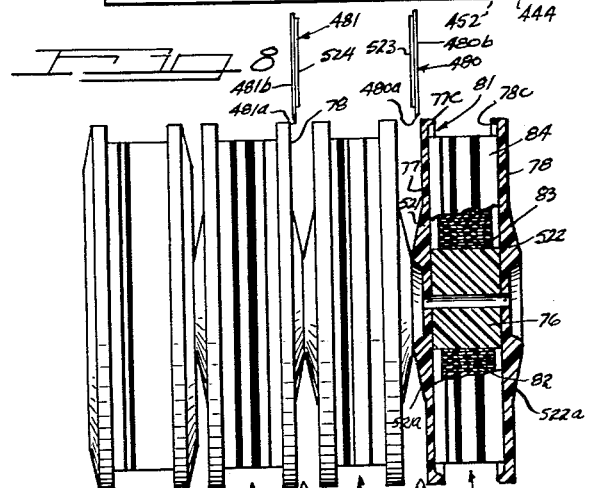

May 26, 1964 M. CAMRAS 3,134,550
TAPE CARTRIDGE SELECTOR TRANSDUCING MACHINE
Filed March 22, 1961 7 Sheets-Sheet 3
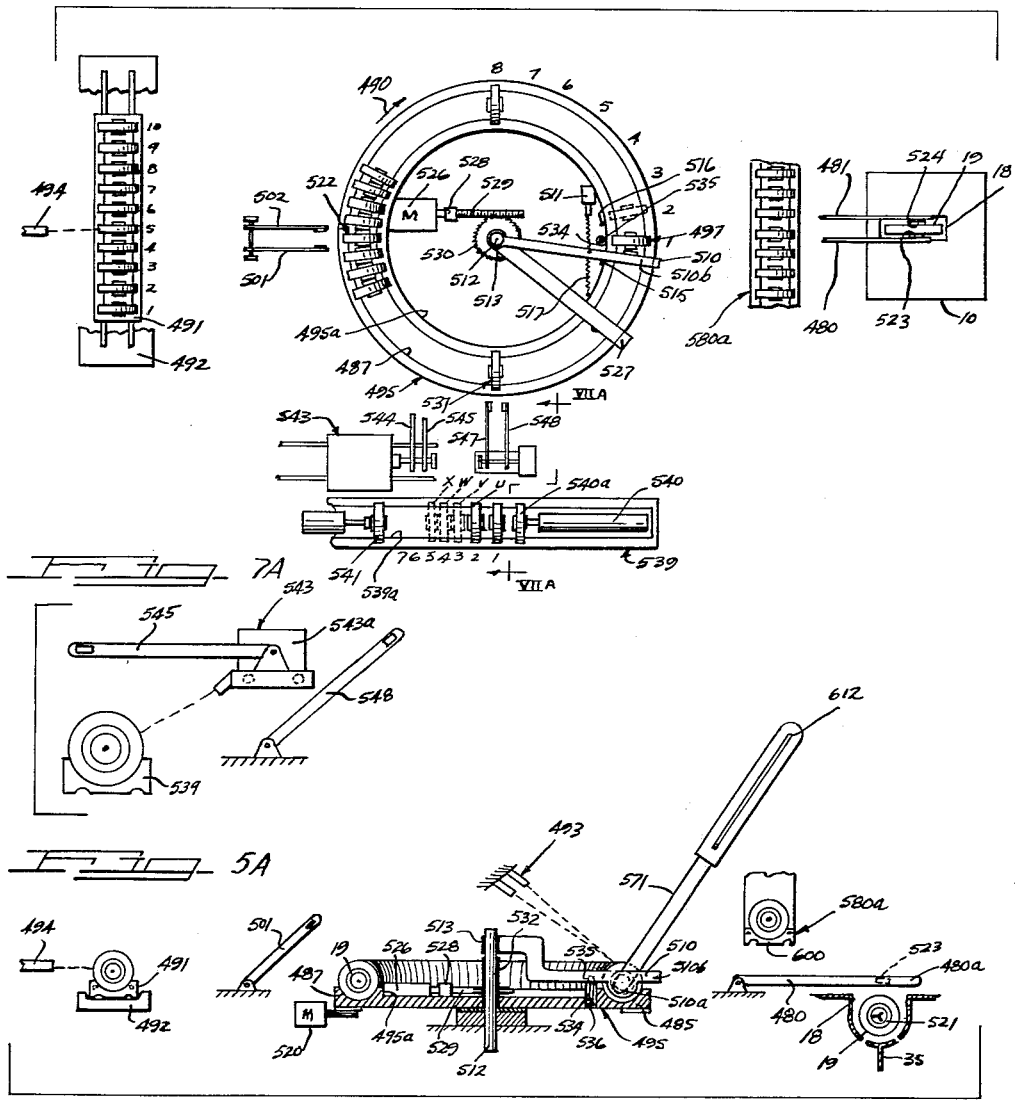
INVENTOR.
Marvin Camras
BY
Hill, Sherman, Meroni, Gross & Simpson ATTORNEYS May 26, 1964  M. CAMRAS  3,134,550
TAPE CARTRIDGE SELECTOR TRANSDUCING MACHINE
Filed March 22, 1961  7 Sheets-Sheet 4
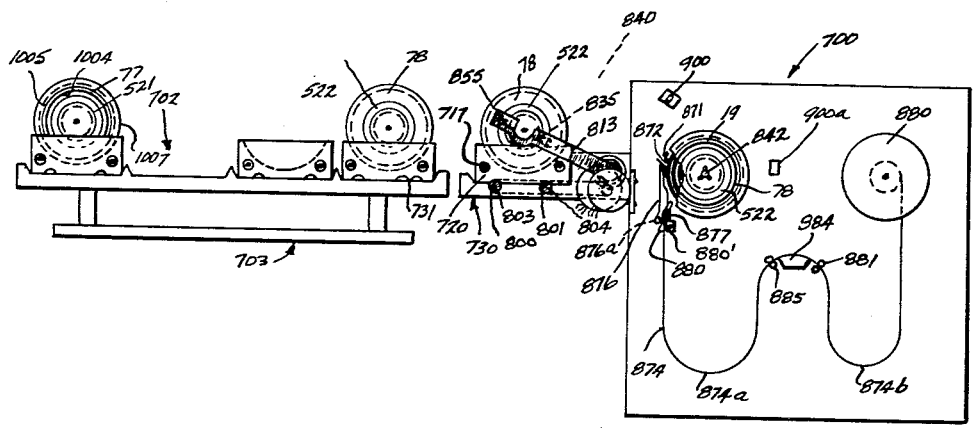
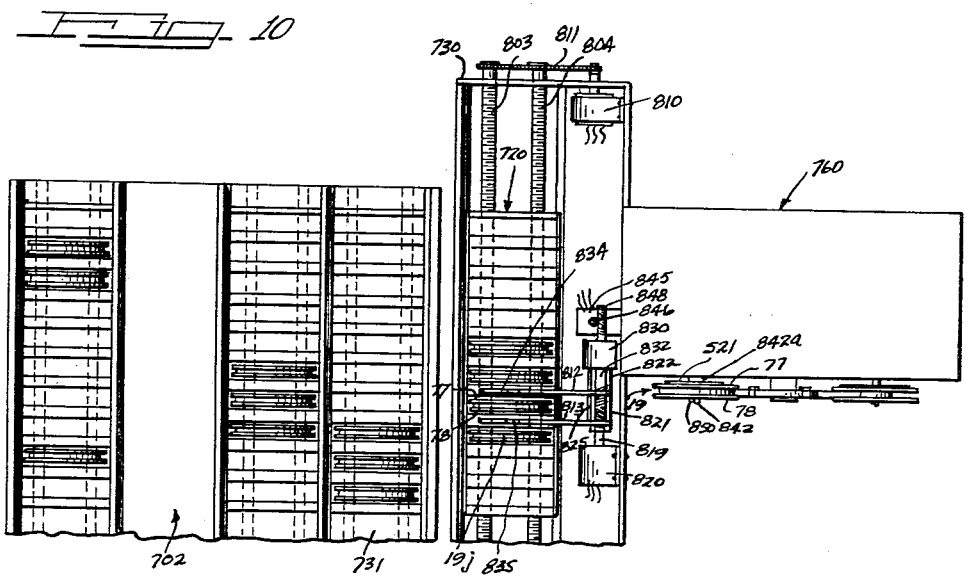
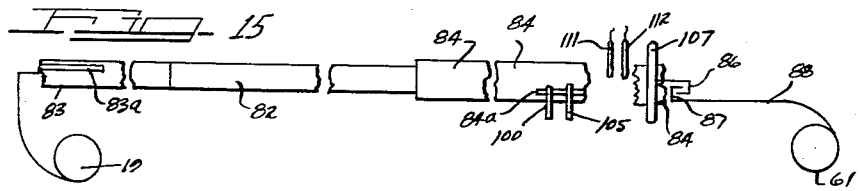
INVENTOR.
Marvin Camras
BY
Hill Sherman Meroni Gross & Simpson ATTORNEYS

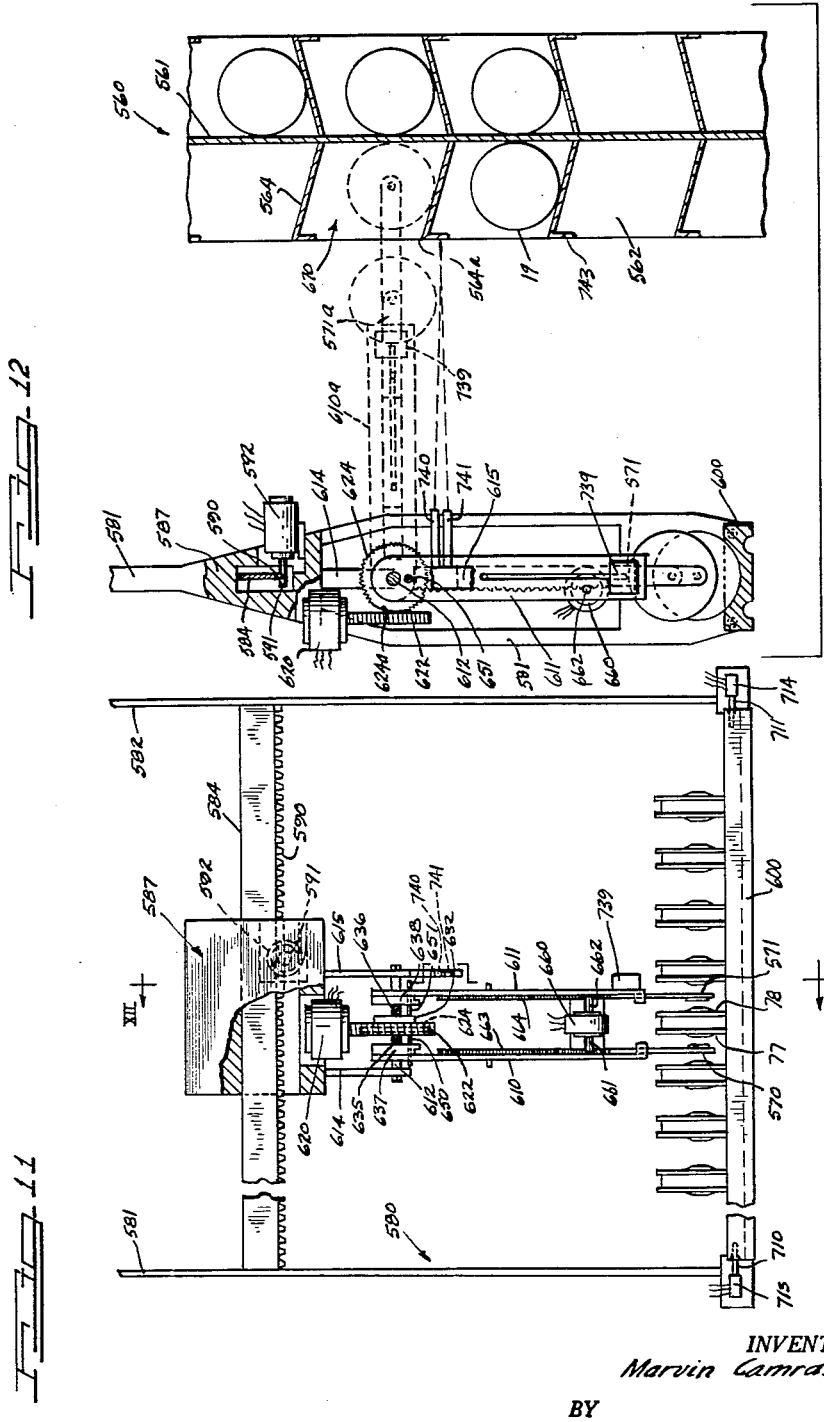

May 26, 1964 M. CAMRAS 3,134,550
TAPE CARTRIDGE SELECTOR TRANSDUCING MACHINE
Filed March 22, 1961 7 Sheets-Sheet 6
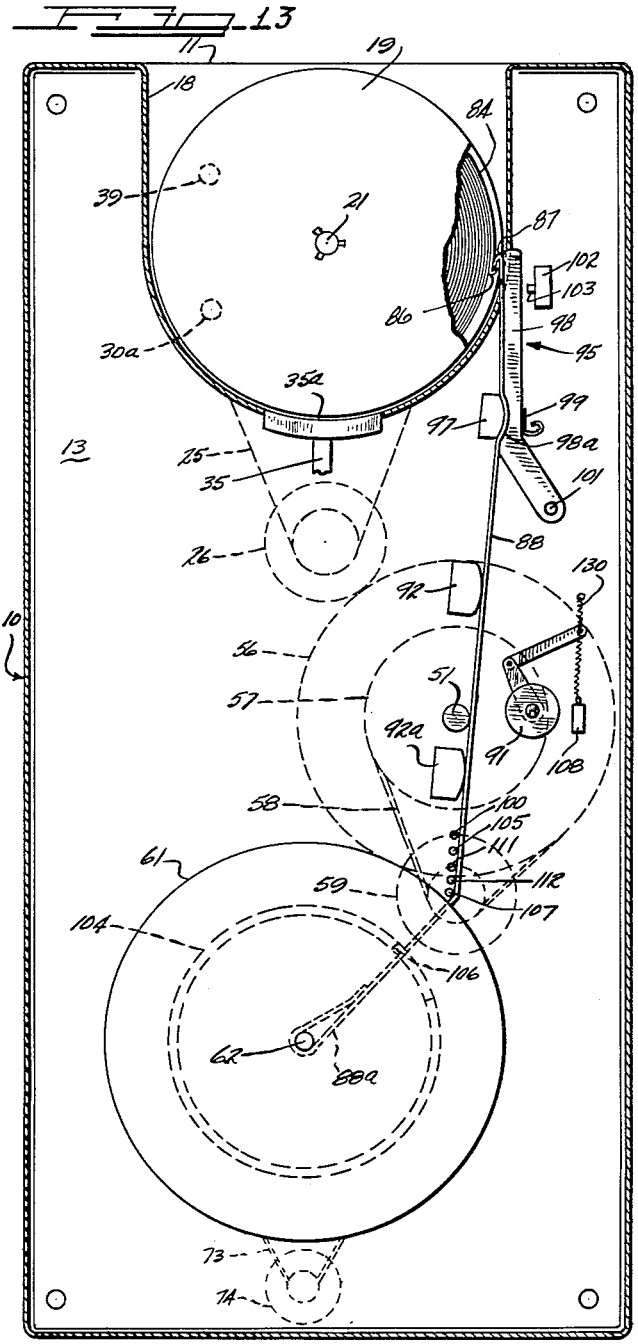
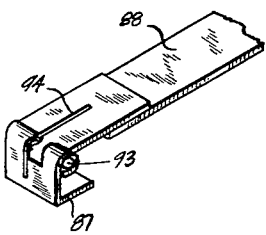
INVENTOR.
Marvin Camras
BY
Hill, Sherman, Meroni, Gross, Simpson ATTORNEYS

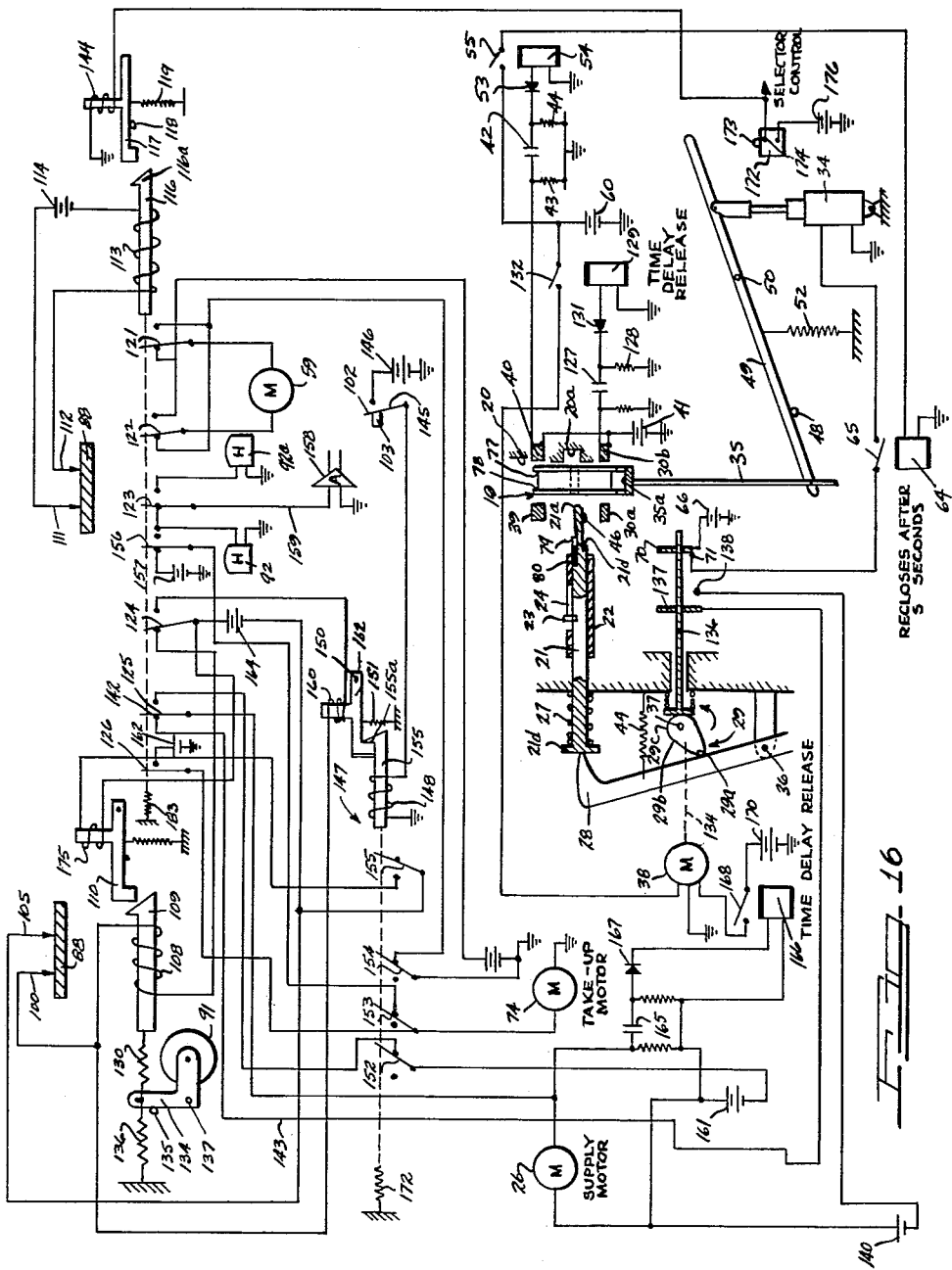

United States Patent Office 3,134,550
Patented May 26, 1964

3,134,550
TAPE CARTRIDGE SELECTOR TRANSDUCING MACHINE
Marvin Camras, Glencoe, Ill., assignor to IIT Research Institute, a corporation of Illinois
Filed Mar. 22, 1961, Ser. No. 97,599
23 Claims. (Cl. 242—55.13)

The present invention relates to a transducing machine and particularly to a machine wherein a plurality of single spool cartridges may be stored and delivered to a tape transport mechanism selectively. The single spool cartridges may each contain a coil of tape, wire or other elongated medium having signals recorded thereon magnetically, electrostatically or by other suitable means. A preferred type of single spool cartridge is disclosed in my copending application Serial No. 801,403 filed March 23, 1959, now Patent No. 3,025,011 of which the present application is a continuation in part.

As disclosed in said copending application, a single spool cartridge may comprise a spool having a record medium wound thereon with a leader connected to the outer end of the record medium and wound in overlying relation to the outer layer of the record medium and retained with the spool to provide a neat, compact and extremely economical cartridge. Such a single spool cartridge is compatible with existing tape transport mechanisms, but is particularly adapted for use with relatively simple and inexpensive automatic threading tape transport machines. Suitable automatic threading tape transport mechanisms are illustrated in detail in the above mentioned copending application.

The mechanism disclosed in the present application is particularly adapted to use with computers and the like wherein a large number of single spool cartridges are to be selectively brought into operative relation to one or more record transducing mechanisms.

It is therefore an important object of the present invention to provide a novel single spool cartridge transducing machine.

Another object of the invention is to provide a transducing machine for selectively playing any of a large number of single spool cartridges stored thereby.

Still another object of the invention is to provide a single spool cartridge transducing machine which is particularly rapid and efficient in operation and provides access to a desired cartridge in a minimum average time.

Other objects, features and advantages of the present invention will be apparent from the following detailed description taken in connection with the accompanying drawings, in which:

FIGURE 1 is a diagrammatic illustration of a first embodiment of a single spool cartridge transducer machine in accordance with the present invention;

FIGURE 2 is a fragmentary horizontal sectional view taken generally along the line II—II of FIGURE 1;

FIGURE 3 is a fragmentary vertical sectional view taken generally along the line III—III of FIGURE 1;

FIGURE 4 is a fragmentary end elevational view looking in the direction of the arrows associated with line IV—IV in FIGURE 1 and illustrating certain details of construction;

FIGURE 5 is a somewhat diagrammatic vertical sectional view illustrating a further system for selecting a desired cartridge from a library of cartridges;

FIGURE 5A is a diagrammatic vertical sectional view showing certain details of the structure of FIGURE 5;

FIGURE 6 is a fragmentary horizontal sectional view taken generally along the line VI—VI of FIGURE 5;

FIGURE 7 is a fragmentary plan view taken looking in the direction of the arrows associated with line VII—VII of FIGURE 5;

FIGURE 7A is a diagrammatic vertical sectional view showing certain details of the structure of FIGURE 7;

FIGURE 8 is a fragmentary vertical sectional view of a single spool cartridge for the embodiments of FIGURES 1 to 4 and 5 to 7;

FIGURE 9 is a fragmentary front elevational view illustrating a further embodiment of the present invention with certain parts broken away and in section;

FIGURE 10 is a fragmentary top plan view of the mechanism of FIGURE 9;

FIGURE 11 is a fragmentary elevational view of a further selector mechanism in accordance with the present invention for use with the tape transport of FIGURES 9 and 10;

FIGURE 12 is a fragmentary vertical sectional view taken generally along the line XII—XII of FIGURE 11;

FIGURE 13 is a somewhat diagrammatic vertical sectional view illustrating details of one type of automatic threading tape transport mechanism for utilization in the preceding embodiments;

FIGURE 14 is a fragmentary perspective view illustrating the threading leader coupling of the automatic threading tape transport mechanism of FIGURE 13;

FIGURE 15 is a fragmentary diagrammatic view of the tape and associated leaders and indicating certain electric control features associated therewith; and FIGURE 16 is a diagrammatic illustration of a suitable electric control circuit for automatically operating the tape transport mechanism.

As shown on the drawings:

The present application is a continuation in part of my copending application Serial No. 801,403 filed March 23, 1959 which in turn is a continuation in part of my application Serial No. 690,042 filed October 14, 1957 and now abandoned. The disclosures of both of these preceding applications are incorporated herein by reference to illustrate further details of an automatic threading transducer mechanism in accordance with the present invention.

*Embodiment of FIGURES 1–4*

For the sake of completeness, the general nature of such an automatic threading transducer machine has been illustrated in FIGURES 1, 13, 14, 15 and 16. Referring to these figures, the reference numeral 10 indicates generally a casing for supporting the various elements constituting the drive mechanism of a magnetic reproducer or a combined magnetic recording and reproducing machine. As best seen in FIGURE 1, the casing 10 includes opposed top and bottom walls 11 and 12 and a vertical partition wall 13.

A portion of the casing 10 is recessed to provide a cartridge receiving well 18 into which a single spool cartridge, generally indicated at 19, may be inserted. A wall portion 20 of the well 18 is provided with an aperture or recess 20a for receiving the free end of a spindle 21 as the cartridge 19 is being locked on the spindle for rotation therewith within the well 18. The spindle 21 is received within a sleeve 22 supported between opposed bearings (not shown). Axial movement between the spindle 21 and the sleeve 22 is permitted by providing a pin 23, FIGURE 16, secured to the spindle and received in a slot 24 on the sleeve 22. The provision of the pin and slot coupling permits retraction of the spindle 21 within the sleeve 22 while preventing rotational movement between the spindle 21 and the sleeve 22.

A collar (not shown) is secured to the sleeve 22 by means of a set screw, and a slipping clutch is provided for driving the spindle 21 through the medium of such collar and a driven pulley freely rotatable on the sleeve 22 and spring urged axially toward the collar.

A positive drive for the rewind condition may be provided through the use of a centrifugal clutch assembly (not shown). The pulley on the sleeve 22 may be driven by means of a belt 25 from a two-speed motor 26, FIGURE 13. For convenience in description, the embodiment may be considered to utilize three motors, but it will be obvious that a single motor with appropriate power transmitting elements can be substituted for the drive units specifically referred to herein.

Spindle 21 has an opposite end portion 21d, FIGURE 16, extending beyond the sleeve 22 and a compression spring 27, FIGURE 16, acts against the end portion 21d to urge it into engagement with a lever 28 whose position is controlled by a cam 29. Suitable means for extending and retracting the spindle 21 including such spring and lever has been indicated diagrammatically by the block 31 in FIGURE 1, and reference is made to my aforementioned copending applications for a detailed disclosure of this means. The means 31 may be operated by a push button or selector from a control panel and in addition to its mechanical function is preferably linked to switches that control the operating sequence of the mechanism. Alternatively, inserting the cartridge into the wall 18 may be utilized to initiate operation of the spindle retracting and extending means 31 from a master sequence control means as indicated at 32 in FIGURE 1. The master sequence control means is thus coupled to a sensing switch or the like within the well 18 so as to cause the spindle 21 to be projected into engagement with a cartridge upon the cartridge being inserted into the well by the selector mechanism to be hereinafter described. By way of specific illustration, such cartridge sensing means in the well 18 may comprise a light source 30a and photocell 30b arranged as indicated diagrammatically in FIGURE 16 so as to be actuated by the insertion of the cartridge without any direct mechanical contact with the cartridge. Control means 32 may respond to the pulse generated by the photoelectric sensing means as the cartridge initially moves into position, to begin the transducing operation. The sensing means may be disposed to one side of an ejector means 35 to avoid actuation by the movement thereof indicated in FIGURE 13.

In FIGURE 1, the spindle 21 is shown in solid outline in driving relation to the cartridge 19. When the cartridge has been played and the tape is rewound onto the cartridge, spindle 21 may be automatically retracted by means of the spindle retracting means 31 under the control of the master sequence control means 32. By way of example, contacts such as illustrated in FIGURES 13 and 15 at 100 and 105 may be bridged by a conducting strip 84a on the outer tape leader 84 as the tape is being rewound on the cartridge 19, and bridging of contacts 100 and 105 may actuate suitable circuit means in the master sequence control 32 to deenergize solenoid 108 and the spindle drive means indicated at 33 which is responsible for drive of the record medium in the rewind direction.

After spindle drive means 33 is deenergized and spindle 21 retracted from the well 18, the master sequence control means 32 may energize ejector relay 34 to drive ejector arm 35 into the well. This movement of ejector arm 35 will raise the cartridge 19 out of the well to a position where it may be engaged by the selector mechanism generally indicated at 47, and returned to its storage location. As indicated in FIGURE 13, the ejector arm 35 may have an arcuate cartridge engaging face 35a of substantial arcuate extent.

The selector mechanism 47 then delivers the next selected cartridge to a position above the well 18 and releases the cartridge into the well. Any suitable means may be provided for insuring that the cartridge 19 when it drops into the well 18 will be positioned with its central axial aperture 77a, FIGURE 3, in sufficient alignment with the tapering end of the spindle 21 so that when the spindle is projected, it will properly engage in the central aperture of the cartridge. By way of example, the retracted position of the cartridge engaging face 35a of ejector arm 35 may be such as to insure engagement of the tip of spindle 21 in the central aperture of the cartridge. Further axial movement of spindle 21 will then lift the cartridge slightly to clear the cartridge of the face 35a by virtue of the tapering configuration of the end of the spindle. A pin 48, FIGURE 1, may cooperate with a lever 49 which is pivotally mounted at 50 to determine the retracted position of ejector arm 35. The lever 49 is urged by a spring 52 to the position shown in FIGURE 1. Insertion of a cartridge into the well 18 actuates the photoelectric sensing device 30a, 30b previously mentioned which then signals the master sequence control means 32. The master sequence control means may discriminate between the pulse of one polarity generated when the cartridge moves into obstructing relation to the photoelectric means and the pulse of opposite polarity generated when the cartridge moves out of obstructing relation to the photoelectric means.

When the cartridge is inserted into the well, the spindle 21 is in a position such as indicated in dotted outline at 21a in FIGURE 1 retracted from the well. After a cartridge 19 is inserted into the well, the master sequence control means 32 energizes the spindle extending means 31 which extends the spindle 21 to engage in the axial aperture 77a of cartridge 19 and press the cartridge 19 against the wall portion 20. With the cartridge abutting the wall 20, the spring urged detent 46 on the spindle is pressed through the aperture in the cartridge to overlie the flange 77 of the cartridge which confronts wall 20. A suitable drive tongue 79, FIGURE 16 is provided on the spindle for engaging in one of a plurality of radial notches such as 77b seen in FIGURE 3. The spindle 21 is now retracted slightly to clear the cartridge 19 from the walls defining well 18. At this time also, master sequence control means assume a position further spaced from the cartridge, but this is not necessary. The most extended position of spindle 21 in indicated in dash outline at 21b in FIGURE 1, the recess 20a accommodating this position of the spindle 21 during the engagement of the spindle with the cartridge. The final position of the spindle is indicated at 21c in solid outline in FIGURE 1 and in this position the cartridge is mounted for free rotation in the well 18.

A capstan shaft 51 is mounted between opposed bearings (not shown) and has a fly wheel 56, FIGURE 13, secured thereto to act as a rotary stabilizer. Capstan shaft 51 has been illustrated as being driven by means of a pulley 57 and a belt 58 from a capstan drive motor 59 in FIGURE 13. The motor 59 may be of the reversible type and is represented by block 69 in FIGURE 1.

The take-up reel assembly includes a take-up reel 61 keyed for rotation with a spindle 62. The latter is received between opposed bearings and is driven through a friction type clutch by means of a belt and motor. The take-up reel drive means has been diagrammatically indicated as component 68 in FIGURE 1.

As seen in FIGURE 8, the cartridge 19 includes a central hub portion 76 and opposed annular flange members 77 and 78. The annular flange members 77 and 78 have centrally disposed apertures such as indicated at 77a, FIGURE 3, in register, together with radial slots such as indicated at 77b as is conventional for magnetic tape reels. The spool dimensions are such as to permit the use of the spool on present day machines either in the computer field or in the home recorder field as desired.

The annular flange members 77 and 78 at their outer peripheries have axially extending confronting annular end portions 77c and 78c which define a slot 81 for the passage of tape 82 trained around the hub 76. The width of the tape 82 is less than the axial dimension of hub 76 as illustrated in FIGURE 8 and is less than the width of the slot 81 so that it may be freely received through the slot as it is unwound from the hub 76.

The inner end of the tape 82 is secured by means of an inner leader 83 to the hub 76 in any convenient manner. As indicated the width of the inner tape leader 83 is substantially the same as the width of the tape 82 so that it may be freely received through the slot 81.

An outer tape leader 84 has its inner end secured to the outer free end of the tape 82 as indicated in FIGURE 15. The leader 84 is preferably composed of a reasonably stiff but flexible material such as a fabric impregnated with cellulose resin or other synthetic resin. As indicated in FIGURE 8, the width of the outer leader 84 is greater than the width of the slot 81 and the outer leader 84 is received behind the confronting peripheral end portions 77c and 78c. The outer leader 84 is wrapped around the body of the tape 82 with one or more complete turns and thus serves very effectively as a dust and moisture cover as well as a mechanical shield to protect the tape 82. The self-retaining feature of the outer leader allows handling of the cartridge without loosening or unwinding of the tape therefrom. The leader 84 nevertheless is still sufficiently flexible so that it may be bent slightly and pulled through the slot 81 to start unreeling of the magnetic tape from the cartridge.

The outer free end of the leader 84 is provided with a hook 86 as indicated in FIGURE 13 by means of which the threading operation is initiated. The hook 86 may be composed of metal, but may just as readily be composed of a suitable synthetic resinous material. Other suitable forms of coupling between the outer leader on the cartridge and threading leader 88 are disclosed in my aforementioned copending application Serial No. 801,403 and in a further copending application Serial No. 41,860 filed July 11, 1960 and the disclosure of both of these applications are incorporated herein by reference as further examples of suitable means for automatically threading the tape from the cartridge 19.

The hook 86 is arranged to cooperate with a hook 87, FIGURE 13, to form a detachable coupling between the leader 84 and a threading member generally indicated at 88. The opposite end of the threading member 88 is anchored by means of a loop 88a to the spindle 62 of the take-up reel 61. The threading member 88 follows the normal transducing path for the tape through the assembly, passing between the capstan shaft 51 and a pivoted capstan roller 91, past electromagnetic heads 82 and 92a and through a tension sensitive mechanism indicated at 95.

The threading member 88 is preferably composed of a flexible, but relatively strong material such as plastic impregnated canvas. The hook 87 is secured to the threading member 88 by means of a hinge including a pin 93 and a coiled spring 94 which normally urges the hook portion 87 inwardly, or counterclockwise as seen in FIGURE 14 of the drawings.

When the cartridge 19 is introduced into the receiving well 18 and properly secured on the spindle 21, the motor 26 is energized for example in response to the angular position of cam 29, FIGURE 16, when the spindle 21 reaches its operating position indicated at 21c in FIGURE 1. The motor runs at a relatively slow speed such that shaft 21 revolves counterclockwise as seen in FIGURE 13 on the order of 60 or 120 revolutions per minute. As the motor 26 rotates the spindle 21 at this slow speed, the cartridge thereon is also rotated slowly for one revolution or less until such time as the hook 86 on the cartridge assembly engages the hook 87 on the threading member 88. At this occurs, the tension created by the engagement of the two hook portions energizes the tension sensing device 95. The latter consists of a generally arcuate surfaced guide member 97 which cooperates with a switch actuating arm 98 having an arcuate portion 98a generally complementary to the shape of the arcuately shaped surface of the guide member 97. With no tension applied to the threading member 88, a relatively light spring 99 holds the arm 98 in the position shown in FIGURE 13, causing the threading member to conform to the arcuate configuration of the slot defined between the arcuate portion 98a and the guide member 97. When, however, a tension is applied by the engagement of the hooks 86 and 87, the arm 98 is pivoted about pivot pin 101 and serves to operate a switch 102 having an operating button 103. Actuation of switch 102 serves to start the take-up motor 74, FIGURE 16, and the capstan drive motor 59 by the operation of a latch relay 147, FIGURE 16, associated with master sequence control means 32.

As the two motors are energized, the outer leader 84 and then the tape 82 are pulled through the slot 81, FIGURE 8, the clutch on the take-up reel 61 being strong enough to overcome that associated with spindle 21. The tape is then pulled past head 92, between capstan shaft 51 and the capstan roller 91, past a guide pin 107 and finally received on the take-up reel 61.

After the hooks 86, 87 have passed between the capstan 51 and the capstan roll 91, which are in open position as shown in FIGURE 13, a pair of contacts 100, 105 are bridged by a metal coating 84a near the lower edge of the outer tape leader 84, thus energizing a solenoid 108 which closes and latches capstan roller 91 in the tape driving position. The armature 109 of solenoid 108 may be held in actuated position by a latch member 110 which is only released by again bridging contacts 100, 105 during rewind of the tape on cartridge 19. The take-up reel 61 has a relatively large diameter hub 104 whose periphery is just great enough to take the length of the threading member 88, so that the hooks fit into the gap 106 of the hub 104. The engaged hooks 86, 87 thus do not provide a protuberance which might interfere with the winding of the tape onto the take-up reel 61. The contour of the receiving slot 106 and the shape of the hooks should be such as to provide a smooth bump-free base for subsequent winding.

In normal running operation, the capstan roller 91 is urged against the tape by the action of the solenoid 108 acting through a spring 130 to urge the roller 91 resiliently against the tape. The machine then functions for normal playback or record conditions with the capstan 51 providing the positive driving action for drawing the magnetic tape across the electromagnet head 92. At this time, the clutch on the supply spindle 21 is still being driven in a counterclockwise direction as viewed in FIGURE 13 at a slow rate of speed to provide a slight amount of tension on the magnetic record member. Similarly, the take-up motor 74 is driven at a sufficient rate of speed in a clockwise direction to provide tension in winding up the magnetic record member on the take-up reel 61.

The machine illustrated may also be provided with circuit means for automatically stopping tape movement in the forward direction and for moving the tape in the reverse direction to rewind the tape on cartridge 19. A second head 92a is indicated for scanning a second channel of the tape during movement of the tape in the rewind direction.

After the tape has been played in the forward direction, that is, moving from top to bottom as indicated in FIGURE 13, the mechanism is automatically reversed by means of a pair of spaced contacts 111 and 112 which cooperate with a thin film of metallic paint 83a appearing near the upper edge on the inner leader 83. When the contacts 111 and 112 are bridged, by the metallic paint film, a solenoid 113, FIGURE 16, associated with sequence control means 32 is energized for example from a direct current source 114. This actuates an armature 116 having a latch portion 116a which then engages a locking arm 117 and is thereby held in the energized position. The locking arm 117 normally rests against a stop 118 and is urged thereagainst by the action of a spring 119.

When the solenoid 113 is energized and the armature 116 moves into locked engagement with the locking arm 117, the movement of the armature may shift the position of six contact arms 121, 122, 123, 124, 125 and 126 which control reversal of the direction of rotation of the capstan motor 59 and other elements to cause the tape to be driven in the reverse direction. Toward the end of rewind operation, the contacts 100, 105 may cause energization of a solenoid 160 to unlatch an "on" control armature 155. Release of the "on" armature 155 deenergizes the driving motors and energizes a latch release solenoid 175 to unlatch the armature of solenoid 108 prior to the time when the hook portions 86, 87 move between the capstan shaft 51 and pressure roller 91. As the machine coasts toward a stop, the leader 88 comes to the position shown in FIGURE 13. Further pull on the hook 87 by the cartridge (which is still coasting) pivots hook 87 on pin 93, FIGURE 14, against the action of spring 94 and disengages the hooks 87 and 86 so that the cartridge can be released. When the tape is completely rewound on the hub 76 of the cartridge, and the outer leader 84 has been completely trained about the tape, the threading member 88 is prevented from further movement by its attachment to the spindle 62. With the tape thus detached from the threading member 88, master sequence control means 32 may be operative to retract spindle 21 so that the spring pressed detent 46 is disengaged from the cartridge and the cartridge can be projected from the receiving well 18 by means of ejector arm 35.

Movement of the spindle 21 into its retracted position as shown in dotted outline at 21a in FIGURE 1, may also serve to reset the machine for another operation. From the foregoing, it will be apparent that the tape transport mechanism 10 may operate entirely automatically in coordinated relationship to the cartridge selector mechanism 47. The details of an exemplary electric circuit and other mechanism for producing this operation will now be described.

*Detailed Electric Circuit for Automatic Threading*

FIGURE 16 illustrates in a very diagrammatic fashion an automatic control circuit for the embodiment of FIGURES 1 through 4. The circuit may best be described by taking the successive operations thereof in time sequence. The spindle 21 is diagrammatically illustrated in its retracted position at the lower center of the figure. A relatively light compression spring 27 acts on a flange 21d at the left end of the spindle 21 to urge the spindle into the retracted position under the control of a lever 28 mounted for pivotal movement on a fixed pivot shaft 36 and held in the indicated position by means of cam 29 which is mounted on a rotatable shaft 37. A relatively strong tension spring 44 urges the lever 28 in the clockwise direction relative to its pivot shaft 36, so that when the cam 29 is driven in the counterclockwise direction by motor 38 which is connected to shaft 37, spring 44 moves the spindle 21 to the right as viewed in FIGURE 16 into engagement with a cartridge such as indicated at 19. As the cam 29 rotates in the counterclockwise direction, the maximum diameter portion 29a of the cam moves out of engagement with the lever, and the lever rotates progressively in the clockwise direction until the minimum diameter active portion of the cam indicated at 29b is in engagement with the lever 28. At this point, spring urged detent 46 has been forced entirely through the axial opening in the cartridge and overlies the flange 77 of the cartridge, with the cartridge resting against the shoulder 21d of the spindle and with the drive tongue 79 retracted against the action of spring 80 so as to lie flush with the shoulder 21d. As cam 29 continues to rotate, a larger diameter portion 29c engages lever 28 to cause the spindle 21 to be retracted slightly by the action of spring 27 clearing the cartridge 19 for rotation within the well of the tape transport mechanism.

Assuming the clamping fingers 214 and 215, FIGURE 1, first insert the cartridge partially into the receiving well 18 with the spindle 21 retracted, the light path between light source 39 and photocell 40, FIGURE 16, is interrupted. This in turn may serve to effectively open the conductive path between source 41 and capacitor 42, causing capacitor 42 to discharge in the closed circuit including resistors 43 and 44. Discharge of capacitor 42 may produce a negative pulse voltage across resistor 44 which is transmitted by rectifier element 53 to momentarily actuate relay 54. Relay 54 may close a contact 55 and hold the contact 55 closed for a predetermined time period after deenergization of the relay 54. Closure of contact 55 applies voltage from a suitable direct current source 60 to a second relay 64 which opens a contact 65 and holds the contact open for a predetermined time period after deenergization of the relay 64. Of course, any suitable means may be provided for responding to the negative pulse generated by capacitor 42 and for holding contact 65 open for a suitable time period and then reclosing contact 65. The effect of opening contact 65 is to disconnect an energizing circuit from direct current source 66 through contacts 70 and 71 to relay 34 controlling lever 49. By proper selection of the delay times introduced by relays 54 and 64, the clamping fingers 214 and 215 will have released the cartridge 19 prior to deenergization of relay 34. In this case, the cartridge 19 will be resting on support face 35a of ejecting arm 35 at the time relay 34 is deenergized. When relay 34 is deenergized, tension spring 52 will be operative to pivot lever 49 in the counterclockwise direction about pivot point 50 to retract ejector 35 from the cartridge receiving well. Lowering of ejector arm 35 will correspondingly lower the cartridge 19 into the operative position with its central aperture sufficiently in alignment with the tapered end of spindle 21.

Alternatively, circuit means may be provided for maintaining the solenoid 34 deenergized as the cartridge is being delivered to the receiving well, in which case release of the clamping fingers 214 and 215 will allow the cartridge to drop completely into the well into the position shown in FIGURE 16.

By way of example, if the solenoid 34 is to be deenergized at the time the new cartridge is delivered to the receiving well, contacts 70 and 71 may control a time delay relay which momentarily closes an energizing circuit to the solenoid 34 after retraction of spindle 21 from a cartridge to be ejected, and which maintains the solenoid energized for a sufficient time to allow the clamping fingers 214 and 215 to engage the cartridge after projection thereof from the well. Since the clamping fingers may remain in the horizontal position during the time when the cartridge is being played, the clamping fingers may be engaged with the cartridge when it is projected from the well in a relatively short time. In this event, the solenoid 34 would only be energized for a predetermined time period immediately after withdrawal of the spindle 21 from its engagement with the cartridge to be ejected.

In either sequence of operation, when cartridge 19 reaches the position shown in FIGURE 16, the light path between source 30a and photocell 30b is interrupted, causing capacitor 127 to generate a negative pulse across resistor 128 which is operative to actuate relay 129 through device 131. The relay or other timing device 129 is operative to close contact 132 and maintain it closed for a predetermined time period after energization of the relay. Closure of contact 132 supplies energy to the cam motor 38 so as to drive the cam in the counterclockwise direction to engage spindle 21 with the cartridge as previously described. Suitable mechanical stops may be associated with the cam 29 to prevent over-travel thereof, and suitable clutch means may be interposed in the driving link indicated at 134 between motor 38 and cam shaft 37. After a predetermined time interval sufficient to drive cam 29 to its extreme counterclockwise position with cam surface 29c in engagement with lever 28, relay 129 will allow contacts 132 to open deenergizing motor 38.

At the same time that larger radius portion 29c of cam 29 engages lever 28, a large radius portion such as 29a may engage switch actuating rod 136 to open contacts 70 and 71 and close contacts 137 and 138. It will be understood that the rod 136 may be made of insulating material and carry a pair of conductive washers 70 and 137 which make contact with stationary contacts 71 and 138 in the respective positions of the rod 136. The time interval during which relay 64 maintains contact 65 in its open position after actuation of relay 54 corresponds to the time required for actuation of relay 129 and driving of cam 29 to its extreme counterclockwise position. Thus, by the time that contact 65 of relay 64 is allowed to reclose, the circuit from source 66 will be opened between contacts 70 and 71 so that the solenoid 34 remains deenergized.

Upon closure of contacts 137 and 138 signalling that the cartridge is properly engaged on spindle 21, a circuit is completed from low voltage motor energizing source 140 through supply motor 26, movable contact 125 and stationary contact 142, line 143, and contacts 137 and 138 to energize motor 26 at a relatively low speed to rotate spindle 21 in the counterclockwise direction as seen in FIGURE 13 and thus to engage hooks 86 and 87.

When hooks 86 and 87 are engaged switch 102, FIGURE 13, is actuated closing contact 145, FIGURE 16, to connect direct current source 146 with solenoid 148 of latch relay 147 shifting armature 155 to the right as seen in FIGURE 16. The armature 155 is retained in its energized position by means of the latch 162 which is provided at 150 and urged by means of tension spring 151 into latching engagement with the latching head 155a diagrammatically indicated in FIGURE 16. Actuation of armature 155 shifts contacts 152, 153, 154 and 155 to the right hand position against the action of spring 172.

Shifting of contact 153 energizes take-up motor 74 from a power source 157 to begin rotating take-up reel 61, FIGURE 13, in the clockwise direction. The capstan motor 59 at this time is energized under the control of contact 154 and contacts arms 121 and 122 in their left hand positions to rotate the capstan shaft 51 in the clockwise direction as viewed in FIGURE 13. As soon as the conductive portion 84a of tape leader 84, FIGURE 15, bridges contacts 100, 105, solenoid 108 is energized shifting armature 109 to the right as viewed in FIGURE 16 against the action of spring 136 to pivot pressure roller 91 against the back surface of the tape 82 to establish driving relationship between the capstan 51 and the tape. Armature 109 is held in its actuated position by latch 110 to resiliently urge the pressure roller 91 against the tape through the medium of spring 130.

At the end of movement of the tape in the forward transducing direction, conductive portion 83a on inner tape leader 83 bridges contacts 111 and 112 as indicated in FIGURE 15 to energize solenoid 113 and shift armature 116 to the right as viewed in FIGURE 16. This shifts contacts 121–126 to their right hand positions against the action of spring 183 to shift the contacts to the rewind position. Solenoid armature 116 is latched in its actuated condition by means of latch member 117.

Contacts 121 and 122 cause the reversal of the direction of rotation of capstan 51 so that the capstan is now rotated in the counterclockwise direction as viewed in FIGURE 13. Contact 123 disconnects head 92 and connects head 92a to amplifier 158 via line 159. Contact 124 in its right hand position prepares for the energization of unlatching solenoid 160 under the control of contacts 100 and 105.

Contact 125 in its right hand position provides for operation of the supply motor 26 at its rewind transducing speed, for example by connecting a relatively higher voltage source 161 to the supply motor under the control of contact 152 of armature 148. Contact 126 in its right hand position supplies a relatively low voltage from source 162 to the take-up motor 74 to tend to drive the reel 61 in the clockwise direction and thus insure a proper tension on the tape between the take-up reel 61 and capstan 51 as the tape is transported in the reverse transducing direction and wound onto the cartridge 19. With this type of energization of supply motor 26 and take-up motor 74, the clutch associated with supply spindle 21 is in effect dominant since the take-up shaft 62 is rotated in the counterclockwise direction by capstan 51. When motors 26 and 74 and solenoid 108 are deenergized at the end of the rewind operation, the momentum of the take-up reel 61 is in the direction tending to feed the tape to the cartridge 19. If necessary in a given machine a time delay relay may delay deenergization of supply motor 26 for an adjustable time after release of the capstan drive and deenergization of take-up motor 74, so as to insure that the outer tape leader 84 will be fully engaged behind shoulders 77c, 78c, FIGURE 8, before the cartridge 19 coasts to a stop. Such a time delay relay would be deenergized by opening of contact 152 but would provide a delay before opening a contact in series with source 161.

During rewind movement, when conductive portion 84a on the outer tape leader 84 crosses contacts 100, 105, an energizing circuit is completed for unlatch coil 160 from one terminal of power source 164 through contact 124 in its right hand position, through unlatch coil 160, through contacts 100 and 105 and to the other terminal of the power source 164. Energization of solenoid 160 releases armature 155, shifting contacts 152–155 to their left hand positions. Shifting of contact 152 deenergizes (or initiates deenergization of) the supply motor 26 when then begins coasting to a stop. Shifting of contact 153 opens the high voltage supply circuit to take-up motor 74 preventing energization thereof when armature 116 is released. Shifting of contact 154 to the left hand position opens the energizing circuit for the capstan motor 58, and shifting of contact 155 to the left closes the energizing circuit for solenoid 175 unlatching armature 109 and allowing spring 136 to move the pressure roller 91 away from its operative position. The timing is such that the pressure roller 91 moves clear of the capstan 51 before the engaged hooks 86, 87 of the tape and threading leaders pass between the capstan shaft 51 and the pressure roller 91.

As previously described, as the cartridge 19 coasts to a stop, the threading leader 88 reaches the position indicated in FIGURE 13 where it is prevented from further travel, and the momentum of the cartridge 19 then causes the hook 87 to pivot on its pin 93, FIGURE 14, to release the hook 86. The parameters may be such that the cartridge 19 then comes to a stop prior to a further revolution thereof.

In the diagrammatic illustration, shifting of contact 152 to the left opens a current flow path from source 161 to capacitor 165, causing capacitor 165 to transmit a pulse to relay 166 through rectifier 167 for actuating relay 166. The parameters of the circuit may be such that the low voltage energizing source 140 does not energize relay 166. Thus, relay 166 is only energized at the end of the rewind cycle.

The relay 166 may close contact 168 thereof a predetermined time after energization of relay 166 so as to allow cartridge 19 to come completely to a rest before the spindle 21 is retracted therefrom. Upon closure of contact 168, an energizing source 170 drives motor 38 in an opposite direction of rotation to drive cam 29 in the clockwise direction as viewed in FIGURE 16, thus allowing compression spring 27 to return the spindle 21 to its retracted position indicated in FIGURE 16.

When switch rod 136 reaches the position shown in FIGURE 16, contacts 70 and 71 will again be closed energizing solenoid 34 to raise the cartridge 19 to a position partly out of the receiving well where the cartridge is immediately engaged by the clamping fingers 214 and 215.

When lever 49 has reached its extreme clockwise direction, suitable switch means such as indicated at 172 having an actuating button 173 may shift a movable contact indicated at 174 to its lower closed position to supply energy from a voltage source 176 to release solenoid 144, releasing armature 116 which is then returned to its initial position by means of spring 183.

The electric control circuit indicated in FIGURE 16 is now ready for a further cycle of operation.

As previously mentioned, ejecting arm 35 does not interrupt the light path between source 30a and photocell 30b, and conduction in cell 30b produces a positive pulse which is not transmitted to relay 126 because of rectifier 131. Similarly, when the clamping arms lift the cartridge out of obstructing relation between source 39 and photocell 40, the positive pulse generated is blocked by rectifier 53 and does not actuate relay 54.

It should be understood of course, that the circuit diagram of FIGURE 16 is indicated merely by way of example to illustrate the desired operation. Many other suitable circuit components will readily occur to those skilled in the art for carrying out the desired functions.

A series of cartridges 19 may be stored in a storage rack 210 at positions thereof designated by the numbers 1 through 10. The cartridges 19 in the storage means 210 are mounted in a row with their central axes aligned. The spools are supported in a series of compartments such as indicated at 211 which are open at the top, but are provided with spool supports engaging the lower portions of the flanges 77 and 78 at the axial sides and the marginal edges thereof to confine the spools in the compartments against horizontal movement in the axial direction and against horizontal movement in the transverse or radial direction, while allowing removal of the spools from the respective compartments in the upward direction. A pivot shaft 213 is provided having an axis generally parallel to the series of compartments and generally at the horizontal level of the centers of the spools. This pivot shaft carries a pair of clamping fingers 214 and 215 which are normally spaced in the axial direction a distance slightly greater than the width of the spools so that as the pivot shaft is rotated the clamping fingers will move into engageable relation to a selected spool with the clamping fingers disposed on opposite sides of the spool generally about the level of the center of the spool. The clamping fingers may have rubber pads 216 and 217 at the inner surfaces thereof for engaging the respective flanges of the spools with a frictional grip, whereby upon pivoting of the pivot shaft 213 in the opposite direction, the selected spool may be removed from its compartment.

The pivot shaft 213 has a threaded shaft 220 extending therein and rotatable relative thereto and this threaded shaft has oppositely threaded portions 221 and 222 with respective nuts 223 and 224 thereon which are caused to move axially toward each other and axially away from each other depending upon the direction of rotation of the threaded shaft 220. These nuts 223 and 224 have flanges extending through longitudinal slots 226 and 227 in the pivot shaft 213 and secured to the respective clamping fingers 214 and 215 at the exterior of the pivot shaft so that upon rotation of the threaded shaft in one direction the clamping fingers are moved toward each other while upon rotation of the threaded shaft in the opposite direction the clamping fingers are moved away from each other. It will be understood that the nuts 223 and 224 are fixed against rotation with the threaded shaft, for example by means of the flanges thereof extending in the longitudinal slots of the pivot shaft 213. Similarly, the clamping fingers are mounted on the pivotal shaft 213 for slidable movement in the axial direction, but are prevented from rotation relative to the pivot shaft, for example by virtue of their connection with the nuts on the threaded shaft 220.

Suitable automatic indexing means such as generally indicated at 230 is provided for moving the pivot shaft 213 in the axial direction to transversely align the pair of clamping fingers 214 and 215 with any desired cartridge. Thereafter, the mechanism is automatically energized to rotate the pivot shaft 213 to swing the clamping fingers from a vertical orientation to a horizontal orientation with the rubber pads 216 and 217 on the free ends of the clamping fingers disposed on the opposite sides of the selected spool and horizontally aligned with the central portion of the spool. By way of example, the pivot shaft 213 is illustrated as having a reduced diameter hollow portion 213a which extends within a guide tube 232 to the end thereof where pivot shaft portion 213a has secured thereto a worm wheel sector 235. The guide tube 232 is slidably mounted by means of a guide bracket 237 but is prevented from rotation relative thereto by means of a key 238 riding in a longitudinal slot 239 of the guide tube. The worm wheel sector 235 has gear teeth 237, FIGURE 4, meshing with a worm gear 238 which is driven by a motor 240 carried for movement with the guide tube 232 by any suitable means. The motor 240 may be reversibly energized from the master sequence control means 32 so as to drive the worm wheel sector 235 through an angle of approximately 90° between stop pins 242 and 243 carried by the guide tube 232. In the position of the worm wheel sector 235 shown in FIGURE 4, the clamping fingers 214 and 215 are in their vertical orientation. When the motor 240 is energized to rotate the worm 238 in the proper direction, sector 235 is rotated about 90° counterclockwise to correspondingly shift the clamping fingers 214 and 215 to a generally horizontal orientation.

Longitudinal indexing of the clamping fingers 214, 215 is diagrammatically illustrated as being accomplished by means of a gear 250 which meshes with a linear series of teeth 251 on the guide tube 232. As seen in FIGURE 3, the gear 250 may be mounted on a shaft 253 which is driven by means of a reversible motor 255.

The shaft 220 having oppositely threaded portions 221 and 222 may be driven by means of a motor indicated at 260 fixedly secured within the pivot shaft portion 213 and may be energized in the correct direction under the control of the master sequence control means 32. When the clamping fingers have been moved axially together by means of the oppositely threaded portions 221 and 222, to clamp the spool therebetween, the pivot shaft is rotated in the opposite direction by means of the reversible motor 240 under the control of the master sequence control means 32. As the clamping fingers swing back to the vertical orientation, the selected spool is lifted upwardly out of its compartment 211. The pivot shaft may then be translated in the axial direction by means of gear 250 and guide tube 232 to move the selected spool to a position transversely aligned with the receiving well 18 of the automatic threading tape transport mechanism 10. The tape transport mechanism 10 has its receiving well 18 opening vertically upwardly and so aligned that the axis of spindle 21 is parallel to the axis of pivot shaft 213. The magazine receiving well 18 is so disposed that when the clamping fingers are rotated to a horizontal orientation, the spool is inserted partially into the well, for example slightly less than half way.

If desired, the ejector face 35a of ejector arm 35 may be retained at its upper level to receive the new spool directly from the clamping fingers, after which the solenoid 34 is deenergized by the master sequence control means to allow spring 52 to lower the ejector arm 35 until lever 39 engages the stop pin 48. In this position, spool 19 has its central aperture sufficiently axially aligned with the spindle 21 to permit engagement of the spindle with the spool.

With the selected spool partially in the receiving well of the tape transport mechanism, the clamping fingers are moved axially away from each other by means of the oppositely threaded portions of shaft 220 to release the spool and allow the same to drop into operating position. The spindle 21 is then inserted into the spool automatically, for example in response to the presence of the spool in the magazine receiving well as previously described, and the spool may be played automatically.

After completion of the playback of the recorded tape on the spool, the spindle 21 may be automatically retracted from the magazine receiving well, and a suitable ejecting finger such as indicated at 35 having the engaging face 35a is automatically energized to raise the spool until a major portion thereof projects above the well in position for reengagement with the clamping fingers. The clamping fingers are then again moved axially toward each other by means of the shaft 220 to clamp the spool, and the pivot shaft is then rotated to restore the clamping fingers to the vertical orientation and to lift the spool upwardly out of the receiving well. The pivot shaft is then actuated in the axial direction to return the spool to its compartment.

Suitable indexing mechanisms are well known to those skilled in the art for sequencing the actuations of the pivot shaft and threaded shaft as above described to automatically select any of the spools and to automatically place the same in the playback mechanism for reproduction and to automatically return the spools to the compartments.

By way of example of a suitable indexing mechanism, the guide tube 232 may carry a suitable switch 280 diagrammatically illustrated as having a fixed contact 281 and a movable contact 282. The movable contact 282 may be of magnetic electrically conductive material so as to be adapted to be moved to an open circuit position when the switch is aligned with one of the solenoids such as indicated at 286 which is energized for example from the master sequence control means 32. The solenoids have been given members in correspondence to the position numbers of the compartments of the storage means 210. When the switch 280 is aligned with the solenoid corresponding to the desired compartment position, switch contacts 281, 282 are opened to cause deenergization of the indexing motor 255, FIGURE 3.

As an alternative example, a suitable programming card has been indicated at 290 for determining the sequence in which the cartridges 19 are delivered to the transport mechanism 10. The card 290 may be mounted in a suitable holder 292 of electrically conductive material, and the card 290 may be of insulating material. A contact element indicated at 294 in FIGURES 1 and 2 may be carried on a shaft 297 which is supported for axial movement between brackets 298 and 299. Suitable key means such as indicated at 310 and 311 may be provided for cooperating with a longitudinal groove in the shaft 297 to prevent rotation thereof while accommodating axial movement thereof relative to the brackets 298 and 299. The shaft 297 is provided with gear teeth as indicated at 314 for meshing with a gear portion 317 on shaft 253 which is driven by motor 255, FIGURE 3. Thus, shaft 297 moves axially in precise correspondence with the axial movement of the clamping arms 214 and 215.

Instead of utilizing the switch 280 and associated solenoids 286 controlled from the master sequence control means, energization of motor 255 may be under the control of the electric circuit including contact 294 and the card holder 292. The card 290 of insulating material has a series of ten columns each corresponding to one of the positions of the storage means 10. The contact 294 is caused to traverse successive lines horizontally across the card by means of the shaft 297 travelling in unison with the pivot shaft 213. When the contact 294 engages the support bracket 292 through an opening in the card 290, motor 255, FIGURE 3, is stopped to stop the fingers 214 and 215 at the selected corresponding cartridge.

The card 290 is moved upwardly step by step with the holder 292 relative to vertical support frame members 331 and 332 by means of a ratchet bar 333 secured to the back side of the holder 292 as seen in FIGURE 2. Thus, at the end of each cycle, master sequence control means 32 actuates a pawl drive means 340 to rotate pawl 341 in the clockwise direction, lifting ratchet bar 333 one step. A spring urged retaining pawl 342 retains the bracket in the new vertical position. The motor 255 may be energized so as to scan from an initial position first in one direction along the storage means 210 and then in the reverse direction. Thus, with the contact 294 in the position shown in FIGURE 1, the contact might first scan from the number 3 column to the number 2 column and then to the number 1 column in the new row which is designated on the card 290. Since no opening is encountered in row E on the card with the contact moving in this direction, motor 255 is reversed to cause the contact 294 to scan columns 1, 2, 3 and 4. At column 4 of row E, an opening 350 is found which will close the electric circuit from the contact 294 to the holder 292 and thus cause deenergization of motor 255 in the same way as though the number 4 solenoid 286 had been energized by the master sequence control means 32. It will be apparent that if a series of ten contacts such as indicated at 294 were mounted in a horizontal row to simultaneously scan columns 1 through 10 of card 290, the circuits of the respective contacts could control corresponding solenoids 286 so that in this case the card 290 would control which of the solenoids 286 was energized in each successive cycle corresponding to rows A through H on card 290.

*Summary of Operation of the Embodiment of FIGURES 1 Through 4*

In operation of the embodiment of FIGURES 1 through 4, assuming tape transport mechanism 10 is empty and ready to receive a new cartridge master sequence control means 32 may either directly select the next cartridge associated with storage means 210 to be played by energizing one of the solenoids 286, or may actuate the pawl drive 340 so as to raise program card 290 one step, allowing the program card 290 to select the next cartridge to be played. In either event, motor 255, FIGURES 1 and 3, is next energized to move guide tube 232 and indexing shaft 297 from position 3 shown, for example through positions 2 and 1. If neither position 2 nor 1 has been selected, motor 255 will be reversed by means for the master sequence control means 32 to move tube 232 and shaft 297 in the opposite direction for scanning of positions 1 through 10 in sequence. If solenoid 286 at position 4 has been energized, switch 280 will be actuated when aligned with the position 4 solenoid to stop motor 255. Similarly, opening 350 in row E of card 290 which is at position 4 of the card will be engaged by contact 294 on shaft 297 to energize an electric circuit through the card holder 292 and stop motor 255, if this circuit is energized for controlling the motor 255 instead of the solenoids 286.

In either event, clamping fingers 214 and 215 will be stopped in alignment with the number 4 position of storage means 210 for lifting of the cartridge specifically designated 19d from its compartment by means of the motor 240 at the right hand end of the tube 232, FIGURES 1 and 4. The motor 260 within the pivot shaft 213 controls the clamping action of the fingers 214 and 215.

When a cartridge such as cartridge 19d has been lifted from its compartment by the clamping fingers, the motor 255 is energized to move the arms to a position in alignment with the receiving well 18 of the tape transport mechanism. Motor 240 is now again energized to lower the selected cartridge into the well, and thereafter the motor 260 is energized to cause the clamping fingers 214 and 215 to release the cartridge.

The cartridge is suitably positioned in the well with its central aperture in substantial alignment with the retracted end of spindle 21. The spindle 21 is then projected into the well to press the cartridge 19 against the wall 20 and thereafter to press the spring urged detent 46 through the central aperture and into overlying relation to the flange 77 of the cartridge. The spindle 21 is now retracted slightly to space the cartridge from the wall 20 for free rotation in the well 18. With the cartridge 19 properly positioned on the spindle 21 as seen in FIGURE 13, the spindle 21 is driven at slow speed in the counterclockwise direction to engage hook 86 on the tape leader 84 with hook 87 on the threading leader 88. Tensioning of the threading leader 88 actuates switch 102 to energize motor 74. When the hooks 86 and 87 have travelled passed the capstan shaft 51, contacts 100, 105 in FIGURE 13 cause energization of the solenoid 108 to press the roller 91 against the back side of the tape and thus engage the tape with the capstan shaft 51. Capstan drive motor 59 is also energized to transport the tape past the transducer head 92 at a speed controlled by the capstan shaft 51.

When the tape 82 has been substantially completely wound on the take-up reel 61, electric contacts 111 and 112, FIGURE 13, are bridged by conductive film 83a, FIGURE 15, on the inner tape leader 83 to interrupt transport of the tape in the forward direction and to initiate rewind of the tape onto the cartridge 19. If desired, capstan motor 59 may be energized in a reverse direction and a suitable transducer head 92a provided cooperating with a second channel on the tape so that the capstan 51 controls movement of the tape past the second head 92a at a suitable transducing speed. Such second transducer head may, of course, be positioned between the capstan shaft 51 and the take-up reel 61.

Near the end of the rewind operation, suitable means such as contacts 100, 105 and conductive film 84a, FIGURE 15, may deenergize solenoid 108 prior to the time when the hooks 86, 87 travel between the capstan shaft 51 and pressure roller 91. The same means may deenergize the motor 38 driving spindle 21 in the counterclockwise direction at the relatively higher speed, so that the cartridge 19 begins to coast to a stop. The momentum is such that hook 86 causes hook 87 seen in FIGURE 14 to pivot about shaft 93 when the threading leader 88 reaches the position shown in FIGURE 13 to disengage the hooks 86 and 87. The cartridge 19 may now stop in less than 1 revolution and be ejected from the receiving well 18 by means of the arms 35.

With the cartridge held out of the well 18 by means of the ejecting arm 35, clamping fingers 214 and 215 are again engaged with the cartridge, pivoted to the vertical orientation, returned to the position of the storage cartridge on the storage means 210 and pivoted to return the cartridge to its storage compartment.

The mechanism is now ready for a further cycle, and if the cycle is to be under the control of the card 290, the master sequence control means actuates pawl drive component 340 to lift the card 290 one step for scanning of row F on the card by the contact 294.

It will be understood that the sequence of operation, for example utilizing a programming means such as card 290, may be entirely automatic. Thus the master sequence control means may receive a signal each time a step in the sequence of operation has been completed and initiate a further step in response to such signal.

*Embodiment of FIGURES 5–8*

FIGURES 5 through 8 illustrate a further embodiment of the present invention wherein cartridges 19 are stored in a series of racks such as indicated at 410, 411 and 412. Each compartment in the racks may be defined by a pair of side walls such as indicated at 415, a center wall 416 and a shelf member 417.

Suitable conveyor means 430 is diagrammatically indicated for registering with any one of the selected storage compartments and for receiving a cartridge therefrom. By way of example, the conveyor mechanism is illustrated as comprising a pair of horizontal tracks 432 and 433 receiving rollers such as indicated at 435 and 436 of a horizontal traversing mechanism 438. The horizontal traversing frame 438 slidably mounts a vertically reciprocating shaft 440 by means of a suitable bearing indicated at 441. A motor 444 is indicated in FIGURE 6 having an output shaft 445 for driving a gear 447 meshing with gear teeth 448 on the shaft 440 to raise and lower the shaft 440. The motor 444 is mounted on a transverse carriage 450 having rollers such as indicated at 451 and 452 riding on the horizontal frame 438 for guiding movement of shaft 440 transversely along the length of horizontal frame 438. A further motor diagrammatically indicated at 460 in FIGURE 5 may have a shaft 461 driving a gear 462 meshing with a rack gear 464 on the horizontal frame 438 as seen in FIGURE 6. Suitable motor means are diagrammatically indicated at 468 and 469 for driving rollers 435 and 436 to move the entire horizontal frame 438.

As indicated in FIGURE 5, a carriage mechanism 580 is carried at the lower end of shaft 440 and is provided with clamping fingers 570 and 571, FIGURE 11 for transferring cartridges from the racks to a tray 600 carried by mechanism 580. The cartridges may be unloaded from the carriage 580 directly into the slot 18 of the automatic transport mechanism 10, FIGURE 5, by means of the pivotally mounted clamping arms 570 and 571, best seen in FIGURES 11 and 12, or alternatively the pivotally mounted clamping arms 570 and 571 may transfer the cartridges from the carriage 580 to a turntable arrangement 485. The carriage mechanism 580 is described in detail in connection with the embodiment of FIGURES 9 and 10, hereinafter.

The turntable 485 may have an annular recess 487, FIGURE 7, of cross section configuration to slidably receive the cartridges which are arranged in successive abutting relation. The conveyor mechanism of FIGURE 5 is programmed in any desired manner to deliver a succession of cartridges to the turntable 485 from a position such as indicated at 580a in FIGURES 5 and 5A.

When it is desired to transfer a particular cartridge from the turntable 485 to the playing mechanism 10, the turntable 485 may be rotated in the direction of the arrow 490 to move the successive cartridges past photoelectric scanning means indicated at 493 in FIGURE 5A. As indicated in FIGURE 8, the outer tape leader 84 may have a series of alternate light and dark bands offset in the axial direction and representing a suitable code identification of the particular record tape on the cartridge. When the desired record cartridge is recognized by the photoelectric scanning means 493, the turntable 485 is brought to a stop with this desired cartridge in alignment with the transfer arms 480 and 481. The cartridge is then transferred to the slot 18 for playing in exactly the same manner as described in connection with FIGURE 1.

When the cartridge has been played, it may be returned to its original position on the turntable 485 or to any other desired position. While one cartridge is being played, a cartridge to be discharged from the turntable 485 may be sensed by photoelectric scanning means 493 and positioned for example at the location designated 497 in operative relation to the clamping fingers 570 and 571 of the conveyor mechanism for transfer to tray 600 of the mechanism located at position 580a. Simply by way of example, depending on the particular application, the conveyor mechanism 580 may incorporate photoelectric scanning means for sorting the returning cartridges in accordance with the particular rows such as 410 and 411, 412 and the particular side of a row to which the cartridge is assigned. Thus, the returning cartridges could be accumulated in tray 600 for automatic replacement at any desired point in the operating sequence of the system.

As an alternative, storage in the racks 410–412 may be in random order, with a seeking mechanism, for example of a photoelectric type, for scanning the leaders such as indicated at 84 in FIGURE 8 of each of the stored cartridges until the desired one is found. Cartridges are preferably searched in a sequence related to the frequency with which such cartridges have been used in the past. Thus the most used cartridges are preferably closest to the playing machine 10 and the first ones searched, while the ones seldom called for will generally be in the last part of the storage racks 410–412 and the last ones searched. Thus, in a random system, when searching for a particular cartridge, photoelectric scanning means 493 would first scan the cartridges associated with turntable 495. A tray 491 identical to tray 600 in FIGURE 11 on a suitable indexing device 492 might be provided receiving cartridges which were in excess of the capacity of turntable 495 via clamping fingers 501 and 502, and a scanning mechanism 494 would then scan the cartridges of this linearly indexing tray from the last cartridge received to the first cartridge received in sequence. If a cartridge in the tray 491 were the one desired, this cartridge would be stopped by the scanner 494 in alignment with transfer fingers 501, 502, transferred back to turntable 495, and brought to the transfer position for fingers 480, 481 by scanning means 493.

From the intermediate storage facility provided by indexing means 492 and tray 491, cartridges may be transferred to an empty rack and stored in a predetermined order. For example, if rack 410 were entirely without spools at the beginning of operation, successive returned cartridges would be returned to successive compartments in a row, until filled, then the next row and so forth. If the cartridge were not found on turntable 495 or on the tray 491 at position 492, scanning would then take place along the rows beginning with the last cartridge delivered by the rack and continuing along each row, scanning the cartridges in the reverse of the time order in which the cartridges were stored in the racks. The photoelectric scanning means for carriage 580 may be carried at any suitable position so as to scan successive horizontal rows of cartridges as motors 468 and 469 cause the carriage 580 to move in a horizontal plane along the row.

To illustrate in detail the preferred manner of storing cartridges in undesignated locations for scanning in order of frequency of use, means are shown in connection with FIGURES 5 and 7 for placing cartridges on turntable 495 in order of last use. This same principle is also applicable, of course, the linear storage, as in a series of racks similar to those in FIGURE 5.

By way of illustration of the frequency of use ordering of cartridges, let it be assumed for simplicity, that cartridges are collected by the transfer mechanism 580 and delivered directly to the transducing machine 10 from the position 580a, FIGURE 5, in the desired order. Further, assume that after use of each successive cartridge, the cartridge is transferred by means of the transfer arms 570, 571 of the transfer apparatus 580 from the transducer machine 10 to the position 497 on the turntable 495. With the angular orientation of the turntable shown in FIGURE 7, position 1 of the turntable coincides with transfer position 497, so that the used cartridge is delivered to position number 1 of the turntable.

Prior to a subsequent transfer of a used cartridge to position 497, an arm 510 is actuated by means of a solenoid 511 to pivot about a central shaft 512 fixed to the turntable 495 to rotate therewith. Arm 510 may be provided with a sleeve 513 to accommodate pivotal action of the arm 510 relative to the turntable shaft 512. As seen in FIGURE 7, the arm 510 may be moved from a position in engagement with a stop pin 515 on turntable 495 to a position in contact with stop pin 516 on the turntable, the movement of the arm 510 being resisted by means of a spring 517 having one end connected to the arm 510 and its opposite end secured to a convenient point on the turntable 495. The arm 510 is provided with a semi-circular depending portion 510a, FIGURE 5A, which fits into the semi-circular recess 487 of the turntable. Thus, as the arm 510 moves in the counterclockwise direction relative to the turntable, the cartridge at position number 1 on the turntable is shifted to position number 2 on the turntable. Solenoid 511 is then deenergized, allowing spring 517 to return the arm 510 in the clockwise direction to its initial position against stop pin 515. The next cartridge from the transducer machine 10 is then transferred to position 1, for example by means of the arms 570 and 571 of the transfer mechanism 580, FIGURES 11 and 12. Solenoid 511 is then again energized to shift the cartridge to position 2, at the same time moving the cartridge formerly at position 2 to position 3 on the turntable. It will be appreciated that the cartridges of the present invention may be of relatively small diameter in comparison to their axial extent particularly by virtue of the confronting flange portions such as indicated at 77c, 78c in FIGURE 8 so as to have relatively great stability when supported by a conforming semi-circular surface such as provided by recess 487. A substantial number of cartridges may be shifted as a group in the circumferential direction along the groove 487 by means of a suitable actuating arm such as indicated at 510 when energized by a prime mover of sufficient power. Any suitable means such as numerous overlapped small diameter rollers may be provided defining the wall of recess 487 to facilitate the shifting of a group of cartridges along the length of the groove. Assuming a sequence of cartridges which may be designated by the letters A through J have in sequence been transferred to the transducer machine for playing and then to the turntable in the sequence A, B, C, . . . I and J, then the cartridges would be arranged on the turntable with cartridge J at position 1, cartridge I at position 2, cartridge H at position 3 on the turntable, and so forth.

The transfer mechanism 580 having delivered the cartridges A through J to the transducer machine 10 may return to the library for searching to collect a further group of cartridges in accordance with a predetermined program. It may be assumed for convenience that if the next cartridge to be played is cartridge J, the same cartridge which has just been played, the apparatus will be programmed either to leave the cartridge in the transducing machine without transfer to position 1 of the turntable, or else after transfer mechanism 580 is removed from position 580a, transfer arms 480, 481 are simply actuated to return the cartridge J to the transducing machine without any scanning or searching being necessary.

If, however, some other cartridge is next to be delivered to the machine, a motor 520 in driving relation to the turntable 495 is energized to rotate the turntable in the clockwise direction with scanning means 493 scanning the successive cartridges as they travel from a position slightly in advance of transfer position 497 into the transfer position. The point of scanning is such that if the desired cartridge is recognized by the scanning means 493, the turntable will be brought to a stop with this cartridge occupying transfer position 497. To facilitate this operation, a ratchet type drive may index the turntable in successive steps to move successive cartridges into position 497 in sequence. Thus, the cartridges on the turntable 495 are scanned beginning with cartridge J last used and continuing in order through cartridge A occupying position 10 on the turntable.

If cartridge F is the one desired, the turntable will be stopped with position 5 thereof registering with the transfer position 497 and aligned with transfer arms 480, 481.

In order to facilitate engagement of the transfer arms 480, 481 with the cartridges such as cartridge F, the cartridges may be provided with annular ribs such as indicated at 521 and 522 in FIGURE 8 having sloping radially outer surface portions 521a, 522a for facilitating movement of the transfer arms between successive abutting spools on the turntable. The transfer arms 480 and 481 may have relatively sharp edges as indicated at 480a and 481a for coacting with the sloping surfaces such as 521a and 522a to wedge between and separate the selected cartridge from adjacent cartridges such as cartridges E and G in the present instance. The transfer arms may further have generally disk like protuberances 523 and 524 of outside diameter less than the inside diameter of the ribs 521 and 522 so as to fit into the central space surrounded by the respective ribs. This arrangement provides a positive locking action to eliminate any possibility of the selected cartridge slipping out of engagement with the transfer fingers during the transfer operation.

As the transfer fingers 480, 481 move into engageable relation to the selected cartridge, the spacing between the confronting faces of disk projection portions 523 and 524 on the transfer arms may be slightly greater than the overall axial dimension between the outside surfaces of ribs 521 and 522. In this event, the outside surfaces of transfer arms 480 and 481 as indicated at 480b and 481b will have a separation which is less than the minimum separation between the adjacent flanges of adjacent spools taking into account the manufacturing tolerances with respect to the indexing of the successive cartridges into the transfer position 497. Designating the adjacent cartridges as cartridges E and G, transfer finger 481 will move downwardly with its surface 481b in slightly spaced relation to the flange 78 of cartridge E, while surface 480b will correspondingly be in slightly spaced relation to the surface of flange 77 of cartridge G. The lower ends of the fingers 480a and 481a will then engage the sloping surface portions 521a of cartridge G, and 522a of cartridge E forcing the cartridges E and G in opposite axial direction away from the selected cartridge F. When the locking protuberances 523 and 524 are in direct axial alignment with the center of the selected cartridge, the fingers 480 and 481 are moved toward each other in the same way as described for the clamping fingers 214 and 215 in FIGURE 1 to lock the protuberances 523 and 524 within the recesses defined by the ribs 521 and 522.

The transfer arms 480 and 481 are now rotated through approximately 180° to place a substantial proportion of the periphery of the selected cartridge within the receiving well 18 of the transducing machine 10. When the transfer arms 480 and 481 are now axially separated, the selected cartridge is released and delivered into the operative position within the well 18.

After play of the cartridge, the cartridge may be returned to a desired position on the turntable by means of transfer arms 480 and 481.

If as is preferred, the cartridge F is not returned to position 5 on the turntable, but is placed in advance of cartridge J, the turntable may be indexed to place position 1 thereof in registry with transfer position 497 while cartridge F is being played in the transducer machine 10. Thereafter, solenoid 511 is energized to shift arm 510 from its position against stop 515 to its position against pin 516, moving cartridges J, I, H and G to turntable positions 2, 3, 4 and 5, respectively. The arm 510 may be effectively locked against the pin 516, for example by energization of solenoid 534 to project armature 535 into blocking relation to surface 510b of the arm 510 against the action of a suitable return spring 536. Motor 526 may then be energized to press arm 527 against cartridge A and return cartridges A through E to positions 10, 9, 8, 7 and 6, respectively, cartridge E being moved into engagement with cartridge G at turntable position 5. At this time cartridge G is at position 5, cartridge H is at position 4, cartridge I is at position 3 and cartridge J is at position 2.

After motor 526 has been deenergized, solenoid 534 is deenergized to allow spring 536 to retract armature 535, and solenoid 511 is thereafter deenergized to allow return of arm 510 by means of spring 517.

When cartridge F has been played, transfer arms 480 and 481 reengage their protuberances 523 and 524 with the central recesses defined by ribs 521 and 522, and the arms are pivoted through substantially 180° in the opposite direction to return cartridge F to the turntable at position number 1.

From the foregoing, it will be apparent that if the cartridge F is one which is frequently used, it will remain in a low numbered position on the turntable 495 and will be scanned near the beginning of a search cycle for a new cartridge. The system wherein a cartridge is placed ahead of all other cartridges after each use results in greatly enhanced speed of operation, where certain cartridges are utilized much more frequently than others. In such a case, the system tends to progressively arrange the cartridges in order of frequency of use, while at the same time readily adjusting to a situation where other cartridges come to be more frequently used. The system is thus continuously self-correcting for any new patterns in the use of the various cartridges of the library.

While the turntable arrangement of FIGURES 5 and 7 illustrates the principle of arranging a cartridge in accordance with its frequency of use in the scanning sequence, in practice it would be preferable to arrange all of the cartridges in the library in the same manner. This would be accomplished by utilizing linear storage means comparable to the turntable of FIGURE 7. Thus the storage shelves could have a straight elongated groove corresponding in cross section to the groove 487 of FIGURE 5A and having a series of cartridge positions which may be designated 1 through 100, for example. The cartridge would first be stored in the turntable 495, and as the capacity of the turntable 495 were exceeded, cartridges would be returned to the linear storage groove.

Assuming, by way of example, that the turntable 495 has 22 effective positions, and that the 22nd position thereon is in register with transfer position 537 in FIGURE 7, the transfer arm means 547 and 548 could be actuated each time the turntable is in its position shown in FIGURE 7 after deenergization of the motor 526. Thus, after the cartridges are compacted in positions 2 through 22 and motor 526 deenergized, the transfer arms 547 and 548 will remove any cartridge at position 22 and deliver it to position 1 of the linear storage rack which has been diagrammatically indicated at 539 in FIGURE 7. After each delivery of a cartridge to the semi-circular groove portion 539a of rack 539, a pusher device 540 is energized to shift the cartridge from position 1 to position 2. Thus successive cartridges delivered from the 22 position on turntable 495 are arranged in aligned abutting relation on the rack 539 the most recent arrival being positioned at position number 1 on the linear rack.

When a series of 100 cartridges, for example, is on the rack 539, transfer fingers corresponding to 547 and 548 may transfer the cartridge at position 100 of rack 539 to position 1 of a further rack having a further pusher device such as 540. This transfer device at position 100 on rack 539 may, of course, operate after each actuation of pusher 540 so as to remove any cartridge which reaches position 100 and begin filling a new rack in an analogous manner. A counteracting pusher such as indicated at 541 may be energized after actuation of pusher 540 and while the pusher element 540a is locked at position 2 so as to maintain the cartridges in the compact abutting relationship even though cartridges may be removed at some point along the rack 539.

A linear scanning and pick-up mechanism 543 is indicated for scanning positions 2 through 100 of the rack 539 and for removing any desired cartridge from the rack in exactly the same manner as just described for the transfer arms 480 and 481. In operation, in searching for a desired cartridge, turntable 495 would first be rotated to enable scanner 493 to scan positions 2 through 21. If the desired cartridge were not on the turntable 495, scanner device 543 would then be actuated to scan the cartridges at positions 2 through 100 of rack 539. Assuming a cartridge X at position 5 on the rack 539 was the one sought, the transfer fingers 544 and 545 associated with scanner 543 would be stopped in alignment with position 5 of the rack 539 and would be pivoted into engagement with cartridge X in exactly the manner indicated in FIGURE 8 with respect to cartridge F and transfer fingers 480, 481. During engagement of the transfer fingers 544 and 545 with cartridge X, cartridges U, V and W at positions 2, 3 and 4 might be shifted slightly to the right as viewed in FIGURE 7, and for this reason it is preferred that pusher 540 be again actuated before transfer of a further cartridge to position 1 of rack 539.

The path of transfer arms 544 and 545 of the scanner 543 may be slightly above the position of transfer arms 547 and 548 shown in FIGURE 7 so that with the transfer arms 547 and 548 returned to a position closely adjacent position 1 on rack 539, cartridge X could be transferred a desired position such as position 1 on turntable 495 by arms 544 and 545. The operation of pusher 540 and arms 547 and 548 would, of course, be coordinated so that the arms 547 and 548 are out of position 1 of rack 539 when the pusher 540 is operated.

With cartridge X at position 1 of turntable 495, the turntable 495 may be actuated by motor 526, for example in the counterclockwise direction, to bring cartridge X adjacent the transfer position 497. If, as is preferred, the searching operation is completed while an earlier selection is being played, cartridge X is shifted to position 2 by actuation of arm 510 during indexing of the turntable to place position 1 thereof at transfer position 497.

After return of cartridge X from the transducer machine to position 1 on the turntable 495, a further cartridge which may be designated T may be transferred from position 22 on turntable 495 to position 1 of rack 539. Pusher 540 is then actuated to shift cartridge T to position 2 and cartridge U, V and W to positions 3, 4 and 5, respectively. Thereafter, counteracting pusher 541 would be actuated to push subsequent cartridges such as Y and Z into positions 6 and 7 with cartridge Y in contact with cartridge W. After operation of the counteracting pusher 541, pusher 540 would be unlocked and deenergized to allow return of the pusher element 540a to its initial position shown in FIGURE 7.

It will be apparent that with this mode of operation and storage of cartridges, the entire library of cartridges would ultimately be arranged in accordance with their past history of use so that the most frequently used cartridges would tend to be scanned first and would be closest to the transducer mechanism in terms of path of delivery from their storage position to the well 18.

Where it was desired to use racks such as indicated at 410–412 in FIGURE 5, and to store cartridges without regard to frequency of use, transfer from the turntable 495 could be by means of transfer fingers 501 and 502 to an indexing type tray receptacle 492 operating in the same manner as the indexing mechanism 803, 804 for tray 720 in FIGURES 9 and 10. In this case, when the turntable 495 was not otherwise in use, position 22 thereof would be placed in register with transfer position 552. With the proper compartment of tray 491 aligned with the arms 501, 502, the arms would be moved into engagement with the cartridge at position 22 of the turntable in the same manner as described for arms 480, 481, and the cartridge would be transferred to the next position of the tray 491. For example, if positions 1, 2 and 3 of the tray 491 had previously been filled in succession, the next cartridge would be placed in position 4 on the tray. The tray 491 would then be indexed by means of the indexing support mechanism 492 as described hereinafter in detail in connection with FIGURES 9 and 10, to shift position 5 of the tray into alignment with the transfer arms 501, 502.

In order to provide clearance, arm 527 may be shifted slightly counterclockwise by reverse energization of motor 526 before a cartridge adjacent thereto is picked up by arms 480, 481; 501, 502; or 547, 548. Arm 510 when against stop 515 may be spaced from position 1 by an amount to clear arm 480, 502 or 547 as it delivers a cartridge to the number 1 position on the turntable.

When a scanning operation is undertaken for cartridges on the turntable 495 or tray 491, the tray 491 is indexed to a zero position, for example, having no cartridge therein during the time when scanning mechanism 493 is scanning positions 2 through 22 of turntable 495. If the desired cartridge is not on the turntable, tray 491 is then indexed past the scanning device 494 to scan positions 1 through 10 on the tray. If the cartridge is at one of the tray positions, this position is automatically stopped in direct alignment with the transfer arms 501 and 502, and at the same time empty position No. 1 on the turntable 495 is moved into registry with transfer position 552 to receive the desired cartridge from the tray 491. The turntable 495 is then rotated to move position No. 1 thereof into transfer position 497. The pusher arm 510 may be actuated to shift this cartridge to position No. 2 on the turntable if a cartridge is already in machine 10 and must be transferred to position No. 1 on the turntable before the new cartridge is delivered to the machine. After play of the new cartridge by the transducer machine, the cartridge would be returned to position 1 on the turntable and the cartridge then occupying position 22 on the turntable would be moved to transfer position 552 for transfer to a desired position on the tray 491, for example the position number 4 just vacated by the previously mentioned cartridge.

At any convenient time in the cycle, for example when the tray 491 was completely filled, the transfer mechanism 580 could remove the tray from indexing mechanism 492 and substitute an empty tray therefor.

*Summary of Operation of Embodiment of FIGURES 5 Through 8*

Where the system of FIGURES 5 through 8 represents a storage system with a predetermined location for each individual cartridge, suitable programming means or manual signalling means may supply a request to the conveyor 430 for a certain cartridge which may be any one in the library. The conveyor 430 then idexes according to the cartridge number called for to select the correct cartridge from the racks 410–412.

The cartridge may be delivered from the carriage 580 at position 580a, FIGURE 5, either directly to the automatic threading transducer machine 10 or to the intermediate storage turntable 495 by means of transfer arms 570 and 571, FIGURE 11. If the cartridge is placed on turntable 495 for later use, it is selected by rotating the turntable in the direction of the arrow 490 with scanning means 493 scanning the coded number on the tape leader 84 of each cartridge, FIGURE 8, as it is moved past the transfer position designated by reference numeral 497. The turntable is immediately stopped with the correct cartridge at position 497 and transfer fingers 480, 481 transfer the cartridge to the playing mechanism 10 for playing in the same manner as described with respect to FIGURES 1, 13 and 16.

After play of the selected cartridge, the cartridge is returned to the turntable 495 by means of transfer fingers 480 and 481 and may be returned to its correct position in racks 410–412 by any suitable means. For example, transfer fingers 501 and 502 in FIGURE 7 may remove the cartridge from the turntable 495 and deliver it to a suitable tray 491 identical to tray 720 in FIGURE 10 and having suitable tray indexing means 492 corresponding to that shown at 803 and 804 in FIGURE 10. When fully loaded the tray 491 may be picked up by transfer mechanism 580, and the cartridges thereon returned to their respective predetermined locations in the racks 410–412.

Suitable control means for the turntable 495 and the conveyor mechanism are, of course, well within the skill of the art. The return of cartridges from turntable 495 may be programmed in advance or the carriage 580 may include a scanning means for determining the code numbers of the cartridge thereon, and a computer may then control the conveyor 430 to return each cartridge to the storage location corresponding to the output of such scanning means produced by the cartridge.

If the embodiment of FIGURES 5 through 8, the cartridges are to be scanned beginning with the cartridges most frequently used and progressing toward the less frequently used cartridges, the turntable may be utilized with a series of racks such as indicated at 539 which accommodate sliding movement of the cartridges. Thus, the turntable 495 in conjunction with the racks such as 539 may constitute an embodiment entirely separate from the system including racks 410–412 and indexing mechanism 492. The operation hereinafter described will assume that racks 410–412 and indexing mechanism 492 are not to be employed in the system.

With the system operating under these conditions, it may be assumed that cartridges occupy positions 2–22 of the turntable and positions 2–99 on rack 539.

Turntable 495 would be indexed to place its number 22 position at transfer station 537 and transfer arms 547 and 548 would transfer any cartridge at position 22 of the turntable to position 1 of rack 539 after which pusher device 540 would be actuated to shift the cartridges respectively to positions 2 through 100. Counteracting pusher 541 would then act against the cartridge at position 100 while pusher 540 continued to act on the cartridge at position 2 so as to insure that the cartridges at position 2 so as to insure that the cartridges at positions 2 through 100 are in abutting contact. Thereafter, pusher 541 would be deenergized and thereafter pusher 540 would be deenergized to return pusher element 540a to a position to the right of position 1 on rack 539. A transfer apparatus similar to that at 547, 548 would then remove the cartridge at position 100 of rack 539 and transfer it to position 1 of a second rack, a second pusher corresponding to 540 then shifting the cartridge to position 2 of the second rack and holding the cartridge in position 2 while a second counteracting pusher corresponding to 541 insures that all cartridges of the group on the second rack are in abutting contact at their proper stations.

With positions 2 through 99 of rack 539 occupied and positions 2 through 21 of turntable 495 occupied, the programming means for the system might call for delivery of a new cartridge to the transducing machine 10, which may be assumed to be empty.

In searching for the desired cartridge, turntable 495 would be rotated in the clockwise direction and scanning device 493 would scan the tape leaders 84, FIGURE 8, for the combination of dark and light stripes designating the desired cartridge. If none of the cartridges at positions 2 through 21 of turntable 495 contain the desired cartridge, the turntable would be brought to a stop with position 1 (now empty) at transfer station 537.

Scanning device 543 would now scan positions 2 through 100 of rack 539 in that order. If the desired cartridge were at position 5 of rack 539, for example, and were designated cartridge X, scanning device 543 would immediately be brought to a stop with transfer arms 544 and 545 aligned with position 5 of rack 539. The fingers would then move into engageable relation with the cartridge X, clamp the cartridge therebetween, and rotate approximately 90° to a generally vertically upward orientation. The scanning device would then index to a position in alignment with transfer position 537. The transfer arms 544, 545 would then rotate in an arc of 90° to place the selected cartridge at position 1 of turntable 495, after which the turntable would rotate, for example in the counterclockwise direction to place position 1 of the turntable in registry with transfer position 497. Transfer arms 480, 481 would then move the cartridge X to the well 18 of the transducer machine 10, and the cartridge would be played in the manner described in connection with the embodiment of FIGURES 1 through 4.

During play of the cartridge X, solenoid 511 would be energized and locked against the cartridge at position 2, and motor 526 would be energized to press arm 527 against the last cartridge on the turntable insuring that all the cartridges were in compact abutting relationship. Motor 526 would then be deenergized, solenoid 534 deenergized to unlock arm 510, and solenoid 511 deenergized to allow spring 517 to return arm 510 to its position against stop 515. Position No. 1 would now again be supplied with the cartridge next to be played. Solenoid 511 would now be energized to shift this cartridge to position No. 2 of the turntable. By the end of play of cartridge X, the turntable would be in the position shown in FIGURE 7, with cartridges compactly arranged in positions 2 through 21 of the turntable and with positions 1 and 22 of the turntable empty. The cartridge next to be played would be at position 2 of the turntable.

Cartridge X would be transferred by arms 480, 481 to position 1 on the turntable, and the new cartridge at position 2 would be delivered to the transducer machine for playing. Solenoid 511 is now energized to shift cartridge X to position 2. Motor 526 is again energized to insure a compact arrangement of cartridges; any cartridge at position 22 on the turntable woud be returned to position 1 of the linear rack 539 in readiness for a further cycle.

In this embodiment, it will be apparent that each cartridge after use is returned to the first position scanned in searching for a new cartridge. As the system continues in operation over a period of time, the cartridges which are most frequently used will be nearest the transducing machine 10 and will be the ones first scanned in searching for a new cartridge to be played. In this way, the average searching time for a cartridge to be played is minimized, and yet the system readily "learns" to adapt to a new set of circumstances where other cartridges may be more frequently used.

*Embodiment of FIGURES 9 and 10*

FIGURES 9 and 10 illustrate a further embodiment of the invention characterized by the provision of means for delivering cartridges from a linearly movable multi-compartment tray to a non-shifting spindle type transducing machine. The conveyor mechanism for this embodiment may include the conveyor 430 and the carriage 580 illustrated in FIGURES 5, 6, 11 and 12. The system may use a volume type storage of cartridges in a series of racks such as indicated at 410–412 in FIGURE 5 and at 560 in FIGURE 12. Each rack may comprise a center wall such as 561, and a succession of side walls such as indicated at 562, and bottom walls such as 564 defining the successive compartments for receiving individual cartridges indicated at 19. The cartridges may have annular ribs such as 521 and 522 in FIGURE 8 to facilitate removal of the cartridges from the compartments. The transfer device 580 of FIGURES 5, 11 and 12 is utilized to deliver loaded trays of cartridges to the indexing mechanism 803, 804. Where the cartridges are not to be used with a sliding feed turntable or the like, the cartridges may have flat sides—omitting ribs 521 and 522 shown in FIGURE 8, but such ribs have the advantage of spacing the outer portion of the cartridge 19 from the opposite side walls of the compartments to allow the clamping fingers 570 and 571 of the transfer device to be reliably inserted into the compartments on opposite sides of the outer peripheral portion of the cartridge 19. The supporting walls 564 of rack 560 have a suitable slope toward the center wall 561 so as to reliably retain the cartridges in the respective compartments.

The carriage mechanism generally designated by the reference numeral 580 may have a pair of suspending arms 581 and 582 suitably secured to a depending mechanism such as indicated at 440 in FIGURE 5 which may be moved in rectilinear horizontal directions as well as up and down. The carriage 580 may further include a cross piece 584 supporting an inner shuttle frame 587 for movement parallel thereto. Simply by way of example, the shuttle 587 has been illustrated as being slidably supported on the cross bar 584, at the upper edge face of the cross bar. The lower edge of the cross bar 584 has been shown as having a series of rack teeth 590 meshing with a pinion type gear 591 on the shaft of a motor 592. The motor 592 is thus operative to move the shuttle 587 horizontally along the cross bar 584 to align clamping fingers 570, 571 with any one of the cartridges 19 carried by tray 600 which is supported from the arms 581 and 582.

Mounting arms 610 and 611 are pivotally carried on a shaft 612 between mounting brackets 614 and 615 depending from shuttle 587. A motor 620 is indicated as having a suitable worm gear 622 driven thereby and meshing with a worm wheel 624 freely carried on the shaft 612. Motor 620 is operative to rotate mounting arms 610 and 611 and the mounting shaft 612 relative to brackets 614 and 615.

A motor is diagrammatically indicated at 632 whose casing is secured to worm wheel 624 and whose rotor is secured to shaft 612. The shaft 612 has oppositely threaded portions 635 and 636 engaging nuts 637 and 638 on mounting arms 610 and 611. It will be appreciated that shaft 612 is freely rotatably mounted by brackets 614 and 615, while gear 624 and motor casing 632 are prevented from rotation relative to nuts 637 and 638. To indicate this diagrammatically, pins 650 and 651 have been indicated which are secured to the motor casing 632 and to gear 624 but extend through openings in nuts 637 and 638 to prevent rotation thereof while allowing axial movement of the nuts toward and away from the motor casing 632 and gear 624.

A further motor 660 has been indicated having pinion gear shafts 661 and 662 driving rack teeth 663 and 664 on clamping fingers 570 and 571 to retract and extend the fingers. The fingers 570 and 571 are guided for such longitudinal movement relative to support arms 610 and 611 by any suitable means.

Thus to remove a selected cartridge 19 from the supporting tray 600, motor 632 is first energized as seen in FIGURE 11 to bring the fingers 570 and 571 into clamping engagement with the opposite flanges 77 and 78 of the selected cartridge 19. Motor 660 is then energized to lift the selected cartridge to a position such as indicated in solid outline in FIGURE 12 with the cartridge clear of the supporting tray 600. Motor 620 is then energized to pivot the arms 610 and 611 to a horizontal orientation as indicated in dash outline at 610a in FIGURE 12. Thereafter, motor 660 is energized in the opposite direction to extend the arms 570 and 571 to insert the cartridge into a selected compartment such as indicated at 670 in FIGURE 12. Motor 632 is now energized in the reverse direction to spread the clamping fingers 570 and 571 and release the cartridge within the compartment, and motor 660 is energized to retract the fingers from the compartment. Gear wheel 624 has no teeth at sector 624a, FIGURE 12, to allow arms 570 and 571 to pivot upwardly slightly as the cartridge moves over ledge 564a.

To then remove a desired cartridge, the conveyor mechanism illustrated in FIGURE 5 including motors 444, 460, 468 and 469 are controlled to move the fingers 570 and 571 into alignment with the compartment having the selected cartridge.

When the fingers are properly aligned, motor 660 is energized to extend the fingers into the compartment on opposite sides of the cartridge therein, and the fingers are clamped to the opposite sides of the cartridge and then removed from the compartment. The smooth sector 624a of gear wheel 624 allows upward pivoting of arms 570 and 571 as the cartridge moves up the incline provided by bottom wall 564.

The mechanism of FIGURES 11 and 12 is thus equally adapted to removing or replacing a plurality of cartridges, all of which may be stored on a tray such as indicated at 600 for delivery to or from a transducer machine such as indicated at 700 in FIGURE 9.

For example when a tray such as 600 has been filled with cartridges to be played on the transducer mechanism 700, the conveyor may deliver the tray 600 to a tray storage location such as indicated at 702 in FIGURE 9 on a tray stand 703. The carriage 580 is indicated as having four releasable fingers such as fingers 710 and 711 which are releasable by means of four solenoids such as 713 and 714, so that the tray 600 may be deposited at position 702 by energization of the solenoids. When the carriage 580 has been lifted above the deposited tray and brought into operative relation to a further tray such as 720 in FIGURE 9, solenoids 713 and 714 may be deenergized, and suitable compression spring means within the solenoids and acting on the inner ends of fingers 713 and 714 may cause the fingers 710 and 711 to be inserted into apertures such as indicated at 717 in FIGURE 9 of the new tray. The tray removed from the tray support 730 adjacent the machine 700 may be temporarily deposited in any suitable location while the carriage mechanism 580 moves a new tray such as that indicated at 731 onto the tray support 730. The carriage 580 then may again pick up the tray 720 and distribute the cartridges therein in desired compartments of the storage volume.

By way of example, the cartridges may have the coding stripes shown in FIGURE 8, and the shuttle 587 may carry a suitable photoelectric scanning means 739 for sscanning the coded numbers of the cartridges associated with tray 720, for example. The scanning mechanism 739 thus may control the conveyor mechanism shown in FIGURE 5 so as to align the individual cartridges of tray 720 with the corresponding numbered compartments of the storage volume. The clamping fingers 570, 571 would then be actuated to return the cartridges to the respective correct compartments.

As a check on correct operation of the indexing mechanism of FIGURE 5, suitable photoelectric sending and receiving means as diagrammatically indicated at 740 and 741 in FIGURE 12 may scan coded numbers at wall surfaces 743 of the storage volume to compare such coded number with the number coded on the leader of the cartridge being returned.

FIGURES 9 and 10 illustrate the manner in which the successive cartridges are delivered to the playing mechanism 700. The trays such as indicated at 720 are provided with knife edge portions such as indicated at 800 and 801 for engaging between successive teeth of worm gears 803 and 804 rotatably mounted in the tray support 730. A motor is indicated at 810 in FIGURE 10 for driving the worm gears 803 and 804 in unison by means of a sprocket chain 811. As the worms 803 and 804 rotate, the tray 720 is indexed relative to the transformer arms 812 and 813. When a desired cartridge is in alignment with the transfer arms, the arms are rotated from a vertical to a horizontal position on opposite sides of the selected cartridge by means such as motor 820 which may have a spur type gearing 819 meshing with spur type 822 may have an elongated slot as indicated at 825 through which the arms 812 and 813 project but which prevents relative rotation between the arms and the sleeve. The spur type gearing 819 on the shaft of motor 820 and on sleeve 822 is elongated axially to accommodate relative axial movement between the gearing 821 and gearing 819 without disengagement thereof. A motor 830 has its casing secured to sleeve 822 so as to rotate therewith and has its rotor driving an oppositely threaded shaft 832 cooperating with the nut portions of the clamping fingers 812 and 813 to move the clamping fingers toward and away from each other as in preceding embodiments.

Thus, with the clamping fingers in the orientation shown in FIGURE 9, motor 830 is energized to move semi-circular ribs 834 and 835 on the clamping fingers toward each other to engage within the ribs 521 and 522 on the opposite flanges 77 and 78 of the selected cartridge. Thereafter, motor 820 is energized to rotate sleeve 822 and fingers 812 and 813 through an arc such as indicated in dash line at 840 in FIGURE 9 until the selected cartridge overlies spindle 842 of the machine 700.

A motor such as indicated at 845, FIGURE 10, is now energized to rotate its shaft 846 with spur type gearing thereon to move threaded shaft 848 axially and with its motor 830 and sleeve 822. This action moves the cartridge axially onto the spindle 842 and causes the usual spring urged detent 850 on the spindle to snap into overlying relation to the flange 78 of the cartridge. For convenience of illustration, a cartridge is already shown in place on the spindle 842 in solid outline in FIGURES 9 and 10.

With the cartridge in place, motor 830 would be energized to spread the clamping fingers 812, 813 to allow the cartridge freedom of rotation with the spindle. As indicated at 855 the clamping fingers 812 and 813 would have an arcuate recess to accommodate the enlarged diameter shoulder 842a of spindle 842 with the cartridge carried by the clamping fingers on the spindle. The axial length of the shoulder 742a must be such as to allow the separating movement of the clamping arm 712 in releasing the spool 19 for rotation with the spindle. The semicircular rib 835 of clamping arm 813 must fit into the annular space between shoulder 842a and rib 521 of the spool. Similarly, the semicircular rib on the arm 812 must fit with annular rib 522 of the spool.

The automatic threading mechanism illustrated in this embodiment may be identical to that shown in FIGURES 13 and 14, or alternatively may be that illustrated, for example, in FIGURE 13 of my copending application Serial No. 801,403. In the latter instance, the tape leader is provided with a fixed hook indicated diagrammatically at 871 which is adapted to be engaged with an eye member indicated at 872 on the end of the threading leader 874. Spring pressed clamping fingers 876 and 877 cooperate to hold the eye member 872, and are actuated after the cartridge is loaded on the spindle 842 to press the inturned end of the eye member against the periphery of the tape leader. The spindle 842 is then rotated in the clockwise direction as seen in FIGURE 9 until the hook 871 engages through the opening of the eye member 872. Any suitable means such as a thickened portion indicated at 880 in FIGURE 9 on the threading leader 874 may prevent movement of the threading leader 874 beyond the position shown in FIGURE 9, so that upon engagement of the hook 871 in the eye 872, the cartridge 19 will be prevented from further rotation.

After a time interval sufficient for one revolution of the spindle 842 in the clockwise direction, the take-up reel 830 may be energized along with the capstan driving means 881 to unwind the tape from the cartridge 19 and move the same past a transducing head 884 at a controlled uniform transducing speed. Cooperating feed rollers such as indicated at 885 may insure proper contact of the record medium with the transducer head 884 and may provide the controlled speed during rewind of the record medium onto the cartridge 19. The loops indicated at 874a and 874b in the threading leader may be maintained during the transducing operation by any suitable means well known in the art. The take-up reel 880 and cartridge 19 will be rotated in the counterclockwise direction at the correct speeds to maintain the loops indicated. The feed rollers 881 and 885 may have grooves therein as indicated in FIGURE 33 of my application Serial 801,403 to pass the thickened portion 880 and the hook 871. The transducer head 884 may comprise a two channel head for cooperation with one channel of the record medium in one direction of movement and for cooperation with a second channel in the opposite direction of movement of the record medium.

At the end of the rewind movement, the thickened portion 880 on the leader 874 will stop spindle 842 with the hook 871 in engagement with the eye member 872. This condition may be sensed in any suitable manner to terminate the driving action of the feed rolls 885. Thereafter, spindle 842 may be rotated slightly in the counterclockwise direction to disengage the hooks 871 from the eye 872, and the clamping fingers 876 and 877 may be rotated in the counterclockwise direction to position 876a, FIGURE 9 to clear the flanges of the cartridge and to allow axial movement of transfer arms 812 and 813. The transfer arms 812 and 813 may then be moved together to engage the cartridge and shift the same axially of the spindle 842. A suitable position for the clamping fingers 876 and 877 at this time is indicated by the dash line 876a. This generally horizontal orientation of the clamping fingers 876 and 877 will clear the finger 866 of the arm 812 and allow the arm 812 to move the required distance axially of the spindle 842. When the cartridge has cleared the spindle 842, the transfer arms are rotated in the opposite direction along the arm 840 to replace the cartridge in the tray. The tray may now be indexed to the next position for playing of a new cartridge.

While the programming of this system may place the selected cartridges in a predetermined order on the tray 720, it is possible to check that the correct cartridge is being moved into the operative position on the machine 700 by means of a scanning means such as indicated at 900 scanning code stripes of annular configuration on the flange 77 of the cartridge. The code stripes will be scanned first from the outer periphery toward the center of the spool and then the code will be scanned in the reverse order from the center to the outer periphery. The scanning system is designed so that the rib 521 on the cartridge will not interfere with the scanning result. For example, the rib may be entirely black on all cartridges. For illustrative purposes, code stripes are indicated at 1004 and 1005 on a spool 1007 which has its flange 77 outward.

*Summary of Operation of the Embodiment of FIGURES 9 and 10*

In operation of this embodiment, a tray such as indicated at 600 in FIGURE 11 may be unloaded by means of the clamping fingers 570 and 571 under the control of photoelectric scanning means 739 which is adapted to read the coded pattern of stripes indicated in FIGURE 8 across the width of the tape leader 84 on each cartridge. Scanning means 739 thus determines a number indicating the location for the cartridge in the volume storage means indicated at 560. This number may control the indexing means of FIGURE 5 to position the cartridge opposite the compartment to which it belongs. Scanning means 740 and 741 in FIGURE 12 may scan a code number on the wall portion 743 adjacent the cartridge compartment to which the cartridge is being delivered as a check, or the storage compartment wall portion such as 743 may be scanned in order to find the compartment in which the cartridge on the tray 600 belongs.

In this manner, each of the cartridges on the storage tray 600 may be returned to a predetermined compartment in the volume storage region.

By way of illustration, when the tray 600 has been emptied in this manner, it may be deposited in any suitable location by the conveyor apparatus by releasing fingers 710 and 711, FIGURE 11. Thereafter, the carriage 580 of FIGURE 11 may be moved into pickup relation to the tray 720, for example, in FIGURES 9 and 10, and this tray may be transferred to tray location 702 on the tray stand 703. A further tray of cartridges such as tray 731 may then be transferred onto the tray receptacle 730 by the mechanism of FIGURE 11 and the used cartridges thereon returned to their proper locations as just described.

The newly received tray 731 on receptacle 730 is then indexed to place a predetermined one of the cartridges thereon in alignment with the transfer arms 812, 813. The cartridges are transferred in order from the tray to a position axially aligned with the spindle 842. If desired, photocell 999 may scan the cartridge as it is transferred to the position just mentioned to verify that the correct cartridge is about to be played. With the cartridge axially aligned with the spindle 842, motor 845 is energized to translate the arms and move the spool forcibly in the axial direction onto the spindle 842, the spring urged detent 850 holding the spool in the proper operative relation. Thereafter, motor 830 is energized to spread the arms 812 and 813 sufficiently to allow rotation of the spool with the spindle 842. The spindle 842 may be rotated for approximately one revolution in the clockwise direction so as to engage the hook 871 with the eye 872 of threading leader 874. Thereafter, the spindle 842 is actuated in the reverse direction to feed the tape toward the tape loop 874a. Feed rollers 885 and 881 and take-up reel 880 are also energized so as to move the tape past the head 884 at the proper transducing speed.

When the end of the tape is reached, the tape transport mechanism may be reversed and a second channel on the tape may be scanned by a second head unit of head assembly 884. When the tape is fully rewound on the spool 19, protuberance 889 on the threading leader 874 causes the threading leader to stop at a predetermined position as shown in FIGURE 9. The clutch driving the spindle 842 may also slip at this time leaving the hook 871 in engagement with the eye member 872. When this condition is reached, suitable control means may deenergize the spool 842 and give it a slight turn in the counterclockwise direction to disengage the hook 871 from the eye member 872. Thereafter, the clamping fingers 876, 877 are rotated to a generally horizontal orientation as indicated at 876a about pivot 880.

The clamping arms 812, 813 are now clamped to the opposite sides of the spool 19, and the arms are jointly translated in the axial direction by motor 845 to forcibly remove the spool from the spindle 842. When the spool is clear of the spindle, motor 820 is energized to swing the arms 812 and 813 in the counterclockwise direction as seen in FIGURE 9 to return the spool to its position in the tray on the tray support mechanism 730. After release of the cartridge, motor 820 is again energized to place the transfer arms 812, 813 in a generally vertical position as seen in FIGURE 9, and the motor 810 is energized to index the next cartridge into transfer position. The cycle is repeated for each cartridge to be played in the tray, and thereafter the transfer mechanism 580 of FIGURES 11 and 12 may return and reengage with the tray and remove it from the tray receiving mechanism 730.

It will be apparent that an electric circuit may be provided for coordinating the operation of the various components of FIGURES 9 through 12 so as to carry out the operation just described without the intervention of a human operator. For example, an entire program for 24 hours of operation could readily be placed on punched tape or the like to supply any desired sequence of cartridges to the playing mechanism 700 in the desired order.

It will be apparent that the tape transport 700 of FIGURES 9 and 10 may be substituted in either of the embodiments of FIGURES 1 through 4 or 5 through 8, and that the slot load type transport of FIGURES 1 through 4 may be utilized in the embodiment of FIGURES 9 and 10.

While the illustrated embodiments have utilized a prethreaded leader 88 or 874, it will be apparent that a stripping finger as illustrated in my copending application Serial No. 41,860 may be utilized to strip a leader from the single spool cartridge of the present invention, after which suitable roller means or the like may engage the free end of the tape leader and automatically convey it along the threading path and into engagement with a take-up means, without the use of a threading leader. Thus, the means for engaging the cartridges with a supporting spindle disclosed herein are not dependent upon the use of a threading leader for their utility.

In the illustrated embodiments, various details have been given by way of illustration only and not by way of limitation. For example with respect to the embodiment of FIGURES 1 through 4, the automatic threading transducer machine may be of the type illustrated in FIGURE 9 or may embody features of the automatic threading machines of my copending applications Serial 801,403 or Serial 41,860. The particular arrangement illustrated in FIGURE 13 of the present application has been shown by way of illustration particularly because of its simplicity of illustration as compared with the other embodiments. The disclosure of the other automatic threading mechanisms above mentioned are specifically incorporated herein by references with respect to the embodiments of FIGURES 1-4, 5-8, and 9 and 10.

These applications are also incorporated herein by reference as to other features pertinent to the present invention. For example, selected cartridges in any of the embodiments of the present invention may be delivered to a stack of cartridges on an automatic changer type mechanism as illustrated in my copending application Serial 41,860.

In FIGURES 1-8, the transfer fingers delivering the cartridges to the receiving well of the automatic threading machine have only placed the cartridge partially into the well. It will be apparent, however, that with suitable modifications, the transfer fingers could deliver a cartridge directly into axial alignment with a retractable spindle by analogy with the system of FIGURES 9 and 10, for example. The transfer fingers could hold the cartridge in the desired axial alignment as the spindle was projected through the central aperture of the cartridge, after which the transfer fingers could release the cartridge for rotation, as in the embodiment of FIGURES 9 and 10.

The cartridges of the present invention may have any desired configuration and may have the conventional dimensions of present spools used in the home tape recording field or may have the dimensions presently used in the computer magnetic tape field. It will be apparent that greatly simplified handling apparatus is possible where the cartridges are symmetrical about a central axis and preferably of a circular configuration. Certain features of the invention, however, are not limited to a spool type cartridge, and different types of cartridge configuration other than the circular spool configuration are specifically contemplated as falling within the broad scope of the concepts of the present invention. The tape leader may be of a suitable synthetic material such as "Mylar" depending on the type of coded marking desired thereon.

With respect to the embodiment of FIGURES 1 through 4, it will be understood that the solenoids 286 have central iron cores as indicated at 286a which serve to attract the magnetic material of the contact 282 to open contacts 281 and 282. The electromagnets 286 may be energized selectively in any suitable manner and by way of a further example, may be selectively energized by means of a computer which has received any desired type of program which would afford a basis for a desired sequence of energization of the electromagnets. In order to insure precise alignment of the transfer arms 214 and 215 with the compartments of the storage means 210, any suitable means such as a detent type control switch may cooperate with the tube 232 to insure that the motor 240 finally comes to rest with the tube 232 at a precisely determined location. It will be appreciated that the cartridges of the embodiment of FIGURES 1–4 may have the coded markings thereon illustrated in connection with FIGURE 8. The cartridges may be selected in a predetermined order which is programmed into a computer and this type arrangement may be considered to be specifically illustrated in FIGURE 1 wherein the master sequence control means 32 may be considered to be a computer having a suitable program establishing a sequence of operation of the components of FIGURE 1. This type system is particularly useful in data storage applications.

Where the embodiment of FIGURES 5 through 8 is utilized with cartridges having pre-assigned locations in the storage racks 410–412, the cartridges may be returned by means of the mechanism of FIGURES 11 and 12. In this case, assuming the tray 600 contains cartridges to be returned to the storage racks 410–412, a suitable computer or the like would cause the shuttle 587 to move to the extreme left hand position as viewed in FIGURE 11 wherein the scanning means 739 would be scanning to the left of the first cartridge on the tray 600. The computer would then energize the motor 592 to cause the shuttle 587 to move scanning means 739 past the first cartridge on the tray. The signal produced by scanning means 739 would then be registered in the computer and would control the subsequent operation of the conveyor means of FIGURE 5 in locating the first spool in alignment with the desired pre-assigned compartmtnt of the storage racks. The scanning means 740 and 741 would be directed toward the wall surface 743 associated with the desired compartment so as to scan the code on such wall surface just before the conveyor was brought to rest in proper alignment. In this way, the signal from the scanning means 741 to the computer could be compared with the previously stored signal from scanning means 739 to be certain that the cartridge was being returned to the proper compartment. By way of example, with this system, the conveyor mechanism 580 would always move toward a selected compartment at a given level and in a given direction so that the scanning means 740, 741 would receive the coded signal from the selected compartment just before the conveyor mechanism was brought to rest in alignment with such compartment. Similarly, when it is desired to remove a spool from the library by the mechanism of FIGURES 11 and 12, the conveyor mechanism would move toward the given compartment in such a way that the scanning means 740, 741 would receive the coded signal corresponding to the selected compartment just before the conveyor stops in registration with such compartment. Similarly, the scanning means 739 may be maintained in such a horizontal orientation that the scanning means 739 will register the signal from the cartridge in the desired compartment just before the transfer fingers are stopped in alignment with such cartridge. The signals received from the scanning means 739 and 740, 741 can then be compared in the computer to be certain that the desired cartridge has been selected. This type of checking may be incorporated at other points in the selection of cartridges and in the return of the cartridges. Of course, the cartridges may be stored in the racks in accordance with a numerical sequence or by subject matter classification and the like. The computer could then direct the selection or return of cartridges on the basis of its information as to the arrangement of the numbers or subject matter with respect to the racks.

Where the embodiment of FIGURES 5 through 8 is utilized for generally random storage of cartridges, the searching, locating, transferring and rearranging of cartridges is preferably carried out while the automatic threading transducing machine is in operation. The arrangement is preferably such that the next cartridge to be played has always been located and placed at a predetermined position before the end of a previous operation of the transducing machine. In this way, the main transducing machine may operate substantially continuously with only the fixed delay between successive cartridges which is required to remove one cartridge and replace it with the next cartridge from the predetermined position. As previously described, for the embodiment of FIGURE 7, the next cartridge to be played is always at position 2 of the turntable so as to be immediately moved into the transfer position 497 after the previously played cartridge is delivered to position 1 on the turntable. Thus, the amount of time lost between playing of successive records is always the same and is maintained at a minimum independent of the time required for searching for records at different points in the storage system.

While in the various embodiments reference has been made to a two channel tape, it will be understood that this is merely illustrative and that in many applications a group of channels will be scanned in each direction of tape movement. In FIGURES 9 and 10, a leader such as shown in FIGURE 8 may be scanned as the cartridge is shifted axially onto spindle 842 to determine if the correct spool is being applied to the machine. The general location of such a photoelectric scanner is indicated at 900a in FIGURE 9. In FIGURE 9, the hook may be on the machine leader with an eye on the cartridge leader as an alternative.

Where difficulty is encountered in shifting a large number of spools axially as a result of downward pivotal movement of transfer arms such as 480—481, and 547—548, an axially acting pointed rod or sharp edged plate may first act at each axial side of the selected spool to separate the other spools therefrom. The contour of suitable rods is indicated at 1000, 1001 in FIGURE 8. The rods would be withdrawn to a position remote from the spools during engagement of the transfer arms with the selected cartridge. Of course the maximum number of spools to be shifted would be kept within the capabilities of the spool selecting and transfer structure in any given system.

It will be apparent that many modifications and variations may be effected without departing from the scope of the novel concepts of the present invention.

I claim as my invention:

1. In combination, a plurality of single spool cartridges each having only one record medium receiving hub and having a record medium wound on the hub terminating in a free end, means for storing said single spool cartridges each having only one record medium hub thereon in respective assigned spaces of a storage volume, selector means for removing a selected one of said cartridges from its assigned space in said volume and for delivering it to a loading position, automatic threading transducer means for receiving said selected one of said cartridges at said loading position, and said transducer means having means for automatically threading the free end of said record medium of said selected one of said cartridges along a transducing path in said machine.

2. A transducing system for transducing record media wound on respective ones of a series of spools comprising means for storing a series of spools having record media wound thereon at respective storage positions, a spool transducing machine having spool receiving means at a spool receiving position for rotatably mounting a selected one of said spools and having record medium transport means for automatically threading the record medium of a spool at said spool receiving position along said transducing path and for moving the same at a transducing speed along said transducing path during a record transducing operation, spool transfer means releasably engageable with said spools at the respective storage positions and movable to deliver said spools to said spool receiving position, spool sensing means at said spool receiving position for actuation in response to movement of a spool into said spool receiving position, and control means controlling operation of said spool transducing machine and automatically responsive to actuation of said spool sensing means to actuate said transducing machine to initiate threading of said record medium.

3. A transducing system for transducing record media wound on respective ones of a series of spools comprising means for storing a series of spools at respective storage positions, a spool transducing machine having spool receiving means at a spool receiving position for rotatably mounting a selected one of said spools and having record medium transport means for automatically threading the record medium of a spool at said spool receiving position along said transducing path and for moving the same at a transducing speed along said transducing path during a record transducing operation, spool transfer means releasably engageable with said spools selectively at the respective storage positions and movable to deliver said spools to said spool receiving position, means for automatically initiating said transducing machine transport means to move the record medium along said transducing path and to rewind the record medium onto said spool after a transducing operation, means responsive to the record medium being substantially rewound onto said spool, and means controlled by said responsive means to relatively move said spool and said transfer means into engageable relationship at the end of a rewind operation to initiate return of the spool to said storing means.

4. A transducing system for transducing record media wound on respective ones of a series of spools comprising means for storing a series of spools having record media wound thereon at a series of respective storage positions, a spool transducing machine having a retractable spindle at a spool receiving position for extension to engage a spool in said position and for retraction to release a spool held thereby, means for automatically threading said record medium from a spool at said spool receiving position along a transducing path in said machine, means for automatically rewinding said record medium on said spool, means responsive to substantial rewinding of said record medium on said spool, and means controlled by said responsive means to initiate retraction of said spindle to release said spool therefrom, and spool transfer means engageable with said spool and responsive to retraction of said spindle to move into engagement with the spool released by said spindle and to transfer said spool out of said spool receiving position.

5. A transducer system comprising a spool assembly having a coded marking thereon identifying said assembly and including a spool with a record medium wound thereon, a spool transducing machine having a spool receiving spindle for rotatably driving a spool thereon and having record medium transport means for automatically threading the record medium of a spool on said spindle along a transducing path and for moving the record medium at a transducing speed along said transducing path during a record transducing operation, means for moving said spool assembly laterally into axial alignment with said spindle and for moving the spool assembly relatively axially onto said spindle, and means for scanning the coded marking on the spool assembly as it is moved laterally by said moving means.

6. A transducer system comprising a single spool cartridge having only one spool and having a record medium wound on the spool and terminating in a free end, a spool transducing machine having a spool receiving spindle for rotatably driving said spool and having record medium transport means for automatically threading the free end of the record medium of said spool on said spindle along a transducing path and for moving the record medium at a transducing speed along said transducing path during a record transducing operation, and means for moving said spool into axial alignment with said spindle and for then moving the spool axially onto said spindle to place said spool in operative position on said machine in preparation for a record transducing operation.

7. A record transducing system comprising a series of record carrying assemblies having respective individual coded markings thereon identifying the individual assemblies, means for storing said record carrying assemblies at respective storage locations, and record assembly selector means relatively movable along a predetermined scanning path past said series of record carrying assemblies in said storage locations and having means for scanning the coded markings on said record carrying assemblies.

8. A transducer system comprising a series of single spool cartridges each having only one record medium receiving hub and having a record medium wound on the hub and terminating in a free end, a transducing machine for selectively receiving said single spool cartridges and for automatically moving the free end of the record medium of the cartridge in said machine along a transducing path therein, storage means having an elongated channel for receiving said series of cartridges therealong and having means defining said channel for engaging the successive cartridges along said channel to retain the same in a desired orientation in said channel while accommodating displacement of said cartridges along said channel, means for delivering said cartridges from said machine to a receiving position of said channel, means for moving said cartridges from said receiving position along said channel, and means selectively engageable with any of the cartridges disposed on said channel and for delivering successive selected ones of said cartridges to said transducing machine for a transducing operation with respect to the record media thereon.

9. A record transducing system comprising means for storing a series of record carrying assemblies and respective storage locations, said storing means having indicia adjacent each of the storage locations individually identifying said locations and corresponding to respective ones of said record carrying assemblies, and record returning means movable along a predetermined scanning path for scanning the successive indicia at said storage locations and for transferring record carrying assemblies to the respective corresponding storage locations of said storing means.

10. A record transducing system for selectively transducing a selected one of a series of record assemblies comprising a transfer device having a detachable record carrier with a plurality of record assembly receiving locations for receiving said record assemblies, and having means for engaging and transferring said record assemblies carried by said transfer device record carrier and movable selectively to any of said record assembly receiving locations of said carrier to engage a record assembly at such location and transfer such record assembly to a storage location separate from said transfer device, said transfer device having means for detaching said carrier therefrom, and means for moving said transfer device away from the detached carrier for engagement with a second carrier.

11. A record transducing system for selectively transducing any of a series of record assemblies comprising a transfer device having a detachable record carrier with a plurality of record assembly receiving locations and having means for engaging record assemblies carried by said record carrier and movable selectively to any of said record assembly receiving locations of said carrier to engage a record assembly thereat and to transfer such record assembly, a receptacle for receiving said carrier when detached from said transfer device, a record transducing machine having a record assembly receiving position, and record assembly transfer means disposed adjacent said receptacle and relatively movable to engage any of the record assemblies on a carrier at said receptacle and to move such engaged record assembly to said receiving position of said transducer machine.

12. A record carrying device comprising a record assembly including a record medium with an intelligence signal recorded thereon, said record assembly having a coded marking thereon, and scanning means responsive to said coded marking of said record assembly to generate an electric signal differentiating said assembly from other similar assemblies.

13. A record carrying device comprising a single spool cartridge with a record medium wound thereon and having leader means wound in overlying relation to said record medium, said leader means having an exterior surface with a series of marking stripes extending lengthwise of said leader means and successively transversely offset, scanning means movable axially relative to said cartridge and responsive to said marking stripes, and said marking stripes forming effectively substantially closed rings when the leader means is wound on said cartridge to accommodate scanning at substantially any point about the periphery of said cartridge.

14. A record carrying device comprising a single spool cartridge with a record medium wound thereon and including an external surface having a series of marking stripes of concentric ring configuration, and scanning means responsive to said stripes and movable generally radially with respect to the ring configuration of said stripes for providing a substantially identical signal upon scanning of the marking stripes in a generally radial direction regardless of the relative angular orientation of said cartridge.

15. A transducer system for selectively transducing any of a plurality of single spool cartridges comprising endless circuit storage means having a series of storage positions for single spool cartridges movable in sequence past a transfer station, and scanning means disposed adjacent said transfer station in scanning relation to the successive cartridge storage positions for scanning coded markings on the cartridges in said positions.

16. A transducer system for selectively transducing any of a plurality of single spool cartridges comprising storage means having a series of storage positions for single spool cartridges movable in sequence past a transfer station, automatic threading transducer means at said transfer station for receiving cartridges from said storage means and for automatically threading the record medium of a received cartridge along a transducing path to carry out a transducing operation with respect thereto, and scanning means disposed adjacent said transfer station in scanning relation to the cartridge storage positions of said storage means for scanning coded markings on the cartridges in said storage positions.

17. A transducer system comprising a transducer machine for receiving cartridges having intelligence records and for automatically transporting a record of cartridge on said machine to carry out a transducing operation with respect to said record, storage means for storing a series of cartridges in successive storage positions along a scanning path, scanning means responsive to indicia identifying the individual cartridges for scanning the indicia on said cartridges at said storage positions in a given direction along said scanning path from a first storage position through successive storage positions to a last storage position, means for transferring successive cartridges which have been subjected to a transducing operation in said machine to said first storage position of said storage means, and means for shifting each cartridge delivered to said first storage position to successive storage positions along said scanning path prior to the transfer of successive further cartridges to said first storage position to arrange said cartridges in said storage means for scanning in an order tending to correspond to the frequency of use of said cartridges in said transducing machine.

18. A transducer system comprising a series of cartridges having intelligence records and having individual identification means thereon, a transducer machine for receiving said cartridges having said intelligence records and for automatically transporting a record of a cartridge on said machine to carry out a transducing operation with respect to said record, storage means for storing a series of said cartridges in successive abutting relation along a scanning path, and means responsive to the individual identification means of said cartridges for engaging with any of said cartridges of said series of cartridges selectively in response to its identification means and independently of its position in said storage means and for delivering the selected cartridge to said transducing machine along a delivery path which is successively longer for successive cartridge positions progressively more remote from a first cartridge position, and means for returning cartridges from the transducing machine to said first position to tend to place the most frequently used cartridges in positions having the shortest delivery paths to said transducing machine.

19. A transducing system for selectively transducing records comprising a series of individual single spool cartridges each having only a single spool with a record medium wound thereon, means engageable directly with the spool itself of each of said cartridges for storing said cartridges, a transducing machine operable to selectively receive the single spool of any of said cartridges and automatically disengage the record medium from the spool and automatically thread the record medium in the machine and comprising spool receiving means for rotatably mounting the spool of a selected one of said cartridges during a transducing operation, means for rewinding the record medium on the spool at the spool receiving means, and means directly engageable with the spool itself of any of said cartridges in said storing means for selectively engaging and delivering a selected one of said cartridges to said spool receiving means of said transducing machine and for returning said cartridges from said machine to said storing means.

20. In combination, a plurality of individual single spool cartridges each comprising a single spool with a record medium wound thereon, means directly engageable with the single spool itself of each of said cartridges for storing said cartridges, means defining a loading position, selector means directly engageable with the single spool of any of said cartridges for removing any of said cartridges from said storing means and for delivering the same to said loading position, and automatic threading transducer means operable to receive said cartridges delivered to said loading position by said selector means and having means for automatically disengaging the record medium from the spool received thereby and for automatically threading the record medium therein.

21. A transducing system for transducing records comprising a series of individual spools having record media wound thereon, means engageable with the respective individual spools for storing said spools, a spool transducing machine having spool receiving means for mounting a selected one of said spools and having a record medium threading means for automatically disengaging the record medium from the spool at said spool receiving means and for automatically threading the record medium in said machine, spool transfer means releasably engageable with any of said spools at said storing means and movable to deliver said spools selectively to said spool receiving means, spool sensing means at said spool receiving means for actuation in response to movement of the spool engaged by said spool transfer means into engagement with said spool receiving means, and control means controlling operation of said spool transducing machine and automatically responsive to actuation of said spool sensing means to actuate said transducing machine to initiate threading of said record medium therein.

22. A transducer system comprising a single spool cartridge having only a single spool with a record medium wound thereon, a spool transducing machine having a spindle for receiving said spool for rotation therewith and having record medium threading means for automatically engaging the record medium on the spool and threading the record medium in the machine, and means engageable with said spool for moving said spool laterally onto and off of said spindle to selectively place said spool in operative position on said machine.

23. A transducer system comprising a series of single spool cartridges each having only a single spool with a record medium wound thereon, a transducing machine for selectively receiving said single spool cartridges and having means for automatically threading the record medium in said machine, storage means having an elongated channel and having means defining said channel engaging the successive cartridges of said series to retain the same for movement along said channel while being supported by said channel defining means, said channel having a receiving position, means for delivering said cartridges from said machine to said receiving position of said channel, means for moving said cartridges from said receiving position along said channel, and means selectively engageable with any of the cartridges disposed on said channel and for removing selected cartridges from said channel and delivering them to said transducing machine.

References Cited in the file of this patent
UNITED STATES PATENTS

| | | |
|---|---|---|
| 2,941,738 | Burke et al. | June 21, 1960 |
| 3,001,025 | Gaubert | Sept. 19, 1961 |